(12) United States Patent
Wang

(10) Patent No.: US 12,262,232 B2
(45) Date of Patent: Mar. 25, 2025

(54) HANDLING CONSISTENT UPLINK LISTEN-BEFORE-TALK FAILURE

(71) Applicant: Telefonaktiebolaget LM Ericsson (publ), Stockholm (SE)

(72) Inventor: Min Wang, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 331 days.

(21) Appl. No.: 17/773,120

(22) PCT Filed: Oct. 14, 2020

(86) PCT No.: PCT/SE2020/050977
§ 371 (c)(1),
(2) Date: Apr. 29, 2022

(87) PCT Pub. No.: WO2021/086246
PCT Pub. Date: May 6, 2021

(65) Prior Publication Data
US 2022/0369139 A1   Nov. 17, 2022

Related U.S. Application Data

(60) Provisional application No. 62/929,504, filed on Nov. 1, 2019.

(51) Int. Cl.
*H04W 24/08* (2009.01)
*H04W 36/30* (2009.01)
*H04W 74/0833* (2024.01)
*H04W 36/00* (2009.01)

(52) U.S. Cl.
CPC ......... *H04W 24/08* (2013.01); *H04W 36/305* (2018.08); *H04W 74/0833* (2013.01); *H04W 36/0055* (2013.01)

(58) Field of Classification Search
CPC .............. H04W 24/08; H04W 36/305; H04W 74/0833
See application file for complete search history.

(56) References Cited

U.S. PATENT DOCUMENTS

| | | | |
|---|---|---|---|
| 10,979,128 B1 * | 4/2021 | Babaei | H04W 80/02 |
| 2020/0154480 A1 * | 5/2020 | Jose | H04W 74/0825 |
| 2021/0100031 A1 * | 4/2021 | Cirik | H04W 76/19 |
| 2022/0022252 A1 * | 1/2022 | Lee | H04W 76/18 |

(Continued)

OTHER PUBLICATIONS

3GPP, "3GPP TS 38.321 V15.7.0", 3rd Generation Partnership Project; Technical Specification Group Radio Access Network; NR; Medium Access Control (MAC) protocol specification (Release 15), Sep. 2019, 1-78.

(Continued)

*Primary Examiner* — Brenda H Pham
(74) *Attorney, Agent, or Firm* — Weisberg I.P. Law, P.A.

(57) ABSTRACT

A method performed by a wireless device (12) comprises detecting (310) consistent uplink listen-before-talk, LBT, failure. The method also comprises considering or not considering (320) radio link failure to be detected due to detecting (310) consistent uplink LBT failure, depending respectively on whether the wireless device (12) is not monitoring or is monitoring for a problem with a certain procedure (18) when consistent uplink LBT failure is detected.

14 Claims, 22 Drawing Sheets

(56) References Cited

U.S. PATENT DOCUMENTS

2022/0124800 A1* 4/2022 Shi .................... H04W 74/0833
2022/0201758 A1* 6/2022 Wang .................... H04W 36/06
2022/0353914 A1* 11/2022 Zhang .................... H04W 24/08

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300 V15.7.0, Sep. 2019, 1-295.

3GPP, "3rd Generation Partnership Project; Technical Specification Group Radio Access Network; Study on NR-based access to unlicensed spectrum (Release 16)", 3GPP TR 38.889 V16.0.0, Dec. 2018, 1-119.

Ericsson, "Conditional Handover in NR", 3GPP TSG RAN WG2 #105, R2-1900404, Athens, Greece, Feb. 25-Mar. 1, 2019, 1-6.

Ericsson, "Handling LBT Failures", 3GPP TSG-RAN WG2 #107bis, Tdoc R2-1913504 (Revision of R2-1910779), Chongqing, China, Oct. 14-18, 2019, 1-7.

Huawei, et al., "Discussion HO requirements in NR-U", 3GPP TSG-RAN WG4 Meeting #92bis, R4-1911927, Chongqing, China, Oct. 14-18, 2019, 1-2.

ITRI, "Handling of consistent UL LBT failures during Ho", 3GPP TSG-RAN WG2 Meeting #107bis, R2-1913064, Chongqing, China, Oct. 14-18, 2019, 1-2.

Spreadtrum Communications, et al., "LBT Failures Handling in Non-Connected State", 3GPP TSG-RAN WG2 Meeting #107bis, R2-1912243 (revision of R2-1909103), Chongqing, China, Oct. 14-18, 2019, 1-3.

* cited by examiner

TRANSMITTING, TO A WIRELESS DEVICE, SIGNALING INDICATING WHETHER, OR THAT, THE WIRELESS DEVICE IS TO: (I) NOT CONSIDER RADIO LINK FAILURE TO BE DETECTED IF THE WIRELESS DEVICE DETECTS CONSISTENT UPLINK LISTEN-BEFORE-TALK, LBT, FAILURE WHILE MONITORING FOR A PROBLEM WITH A CERTAIN PROCEDURE; OR (II) SUSPEND OR STOP MONITORING FOR CONSISTENT UPLINK LBT FAILURE WHILE MONITORING FOR A PROBLEM WITH THE CERTAIN PROCEDURE
700

HANDLE CONSISTENT UPLINK LBT FAILURE IN ACCORDANCE WITH THE TRANSMITTED SIGNALING
710

FIGURE 7

HANDLING CONSISTENT UPLINK LISTEN-BEFORE-TALK FAILURE

TECHNICAL FIELD

The present application relates generally to a wireless communication system, and relates more particularly to the handling of consistent uplink listen-before-talk failure in such a system.

BACKGROUND

Radio link failure in a wireless communication system is a failure of a radio link at a lower layer of the protocol stack. Once a wireless device considers radio link failure to have been detected, the wireless device may release the radio link and/or attempt to re-establish the radio link from scratch.

A wireless device may consider radio link failure to be detected upon detecting any number of problems which the wireless device monitors in parallel. For example, the wireless device may detect radio link failure if the physical layer indicates a problem (e.g., out-of-sync) to a higher layer a number of times consecutively, and the wireless device fails to recover within a certain time. Or, the wireless device may detect radio link failure if a maximum number of radio link control (RLC) retransmissions is reached. Or, the wireless device may detect radio link failure if a problem occurs with a radio access procedure.

Operation in unlicensed frequency spectrum complicates radio link failure detection. In unlicensed frequency spectrum, a wireless device generally must successfully complete a listen-before-talk (LBT) procedure, e.g., to confirm the spectrum is clear, before being permitted to perform an uplink transmission. Failure of this LBT procedure therefore introduces another source of radio link failure, complicating coexistence with other sources of radio link failure.

SUMMARY

Some embodiments herein concern how a wireless device handles consistent uplink listen-before-talk (LBT) failure, e.g., when operating in unlicensed frequency spectrum. Generally, the wireless device may consider radio link failure (RLF) to be detected upon detecting consistent uplink LBT failure. However, the wireless device may also consider RLF to be detected upon detecting a problem with a certain procedure, e.g., the procedure fails to complete successfully within a certain time duration. The certain procedure may for instance be a random access procedure, a handover procedure, or any procedure that involves the wireless device performing uplink transmission(s) for which uplink LBT is required. The wireless device therefore monitors for RLF due to consistent uplink LBT failure in parallel with monitoring for RLF due to a problem with the certain procedure.

To facilitate the coexistence of these parallel RLF detection mechanisms, then, the wireless device according to some embodiments herein considers RLF to be detected upon detecting consistent uplink LBT failure only if the wireless device was not monitoring for a problem with the certain procedure when the consistent uplink LBT failure was detected. This way, if a problem with the certain procedure occurs because of consistent uplink LBT failure, the wireless device will detect RLF only once (due to detecting a problem with the procedure), rather than detecting RLF twice (once due to detecting a problem with the procedure and once due to detecting consistent LBT failure).

Some embodiments may thereby advantageously avoid triggering redundant or overlapping RLF events, and/or avoid interrupting the procedure due to detecting consistent LBT failure.

More particularly, embodiments herein include a method performed by a wireless device. The method comprises detecting consistent uplink listen-before-talk, LBT, failure. The method also comprises considering or not considering radio link failure to be detected due to detecting consistent uplink LBT failure, depending respectively on whether the wireless device is not or is monitoring for a problem with a certain procedure when consistent uplink LBT failure is detected.

In some embodiments, monitoring for a problem with the certain procedure comprises starting a timer at the beginning of or during the certain procedure and monitoring for expiration of the timer. In this case, expiration of the timer indicates a problem with the certain procedure, and considering or not considering radio link failure comprises considering or not considering radio link failure to be detected due to detecting consistent uplink LBT failure, depending respectively on whether the timer is not or is running when consistent uplink LBT failure is detected.

In some embodiments, the method further comprises monitoring for a problem with the certain procedure, and considering or not considering radio link failure comprises, based on the wireless device monitoring for a problem with the certain procedure when consistent uplink LBT failure is detected, not considering radio link failure to be detected due to detecting consistent uplink LBT failure. In one or more of these embodiments, the method further comprises based on monitoring, detecting a problem with the certain procedure and, responsive to detecting the problem with the certain procedure, considering radio link failure to be detected.

In some embodiments, the method further comprises transmitting a request for connection re-establishment. In this case, the request indicates a cause of the request for connection re-establishment as being consistent uplink LBT failure.

In some embodiments, detecting consistent uplink LBT failure comprises detecting consistent uplink LBT failure in an active bandwidth part in a serving cell of the wireless device.

In some embodiments, the certain procedure is a random access procedure, a handover procedure, or a cell change procedure towards a target cell, and detecting consistent uplink LBT failure comprises detecting consistent uplink LBT failure based on failure to complete an LBT procedure for performing an uplink transmission as part of the certain procedure towards the target cell.

In some embodiments, the problem with the certain procedure is failure of the certain procedure to complete within a certain duration.

In some embodiments, the method further comprises upon an occurrence of an uplink LBT failure, incrementing an uplink LBT failure counter and starting or restarting an inter-failure duration timer. In this case the uplink LBT failure counter is to be reset to zero upon expiration of the inter-failure duration timer, and detecting consistent uplink LBT failure comprises detecting that the uplink LBT failure counter reaches or exceeds a threshold.

In some embodiments, the problem with the certain procedure is a problem that would trigger the wireless device to consider radio link failure to be detected.

In some embodiments, the certain procedure is a random access procedure, a handover procedure, or a cell change procedure.

In some embodiments, the method further comprises receiving, from a network node, signaling indicating whether, or that, the wireless device is to not consider radio link failure to be detected if the wireless device detects consistent uplink LBT failure while monitoring for a problem with the certain procedure.

Other embodiments herein include a method performed by a radio network node. The method comprises transmitting, from the radio network node to a wireless device, signaling indicating whether, or that, the wireless device is to not consider radio link failure to be detected if the wireless device detects consistent uplink listen-before-talk, LBT, failure while monitoring for a problem with a certain procedure.

In some embodiments, the certain procedure is a random access procedure, a handover procedure, or a cell change procedure towards a target cell. In one or more of these embodiments, the consistent uplink LBT failure is failure to complete an LBT procedure for performing an uplink transmission as part of the certain procedure towards the target cell.

In some embodiments, the problem with the certain procedure is a problem that would trigger the wireless device to consider radio link failure to be detected.

In some embodiments, the signaling is included in a command to perform the certain procedure or in a command to perform the certain procedure upon fulfillment of a condition.

In some embodiments, the signaling is included in system information or in dedicated Radio Resource Control, RRC, signaling.

Other embodiments herein include a wireless device. The wireless device is configured to detect consistent uplink listen-before-talk, LBT, failure. The wireless device is also configured to consider or not consider radio link failure to be detected due to detecting consistent uplink LBT failure, depending respectively on whether the wireless device is not monitoring or is monitoring for a problem with a certain procedure when consistent uplink LBT failure is detected.

In some embodiments, the wireless device is configured to perform the steps described above for a wireless device.

Other embodiments herein include a radio network node. The radio network node is configured to transmit, from the radio network node to a wireless device, signaling indicating whether, or that, the wireless device is to not consider radio link failure to be detected if the wireless device detects consistent uplink listen-before-talk, LBT, failure while monitoring for a problem with a certain procedure.

In some embodiments, the radio network node is configured to perform the steps described above for a radio network node.

Other embodiments herein include a computer program comprising instructions which, when executed by at least one processor of a wireless device, causes the wireless device to perform the steps described above for a wireless device. Other embodiments herein include a computer program comprising instructions which, when executed by at least one processor of a radio network node, causes the radio network node to perform the steps described above for a radio network node. In some embodiments, a carrier containing the computer program is one of an electronic signal, optical signal, radio signal, or computer readable storage medium.

Other embodiments herein include a wireless device. The wireless device comprises communication circuitry and processing circuitry. The processing circuitry is configured to detect consistent uplink listen-before-talk, LBT, failure. The processing circuitry is also configured to consider or not consider radio link failure to be detected due to detecting consistent uplink LBT failure, depending respectively on whether the wireless device is not monitoring or is monitoring for a problem with a certain procedure when consistent uplink LBT failure is detected.

In some embodiments, the processing circuitry is configured to perform the steps described above for a wireless device.

Other embodiments herein include a radio network node. The radio network node comprises communication circuitry and processing circuitry. The processing circuitry is configured to transmit, from the radio network node to a wireless device, signaling indicating whether, or that, the wireless device is to not consider radio link failure to be detected if the wireless device detects consistent uplink listen-before-talk, LBT, failure while monitoring for a problem with a certain procedure.

In some embodiments, the processing circuitry is configured to perform the steps described above for a radio network node.

BRIEF DESCRIPTION OF THE DRAWINGS

FIG. 7 is a logic flow diagram of a method performed by a radio network node according to some embodiments.

DETAILED DESCRIPTION

Figure 1:
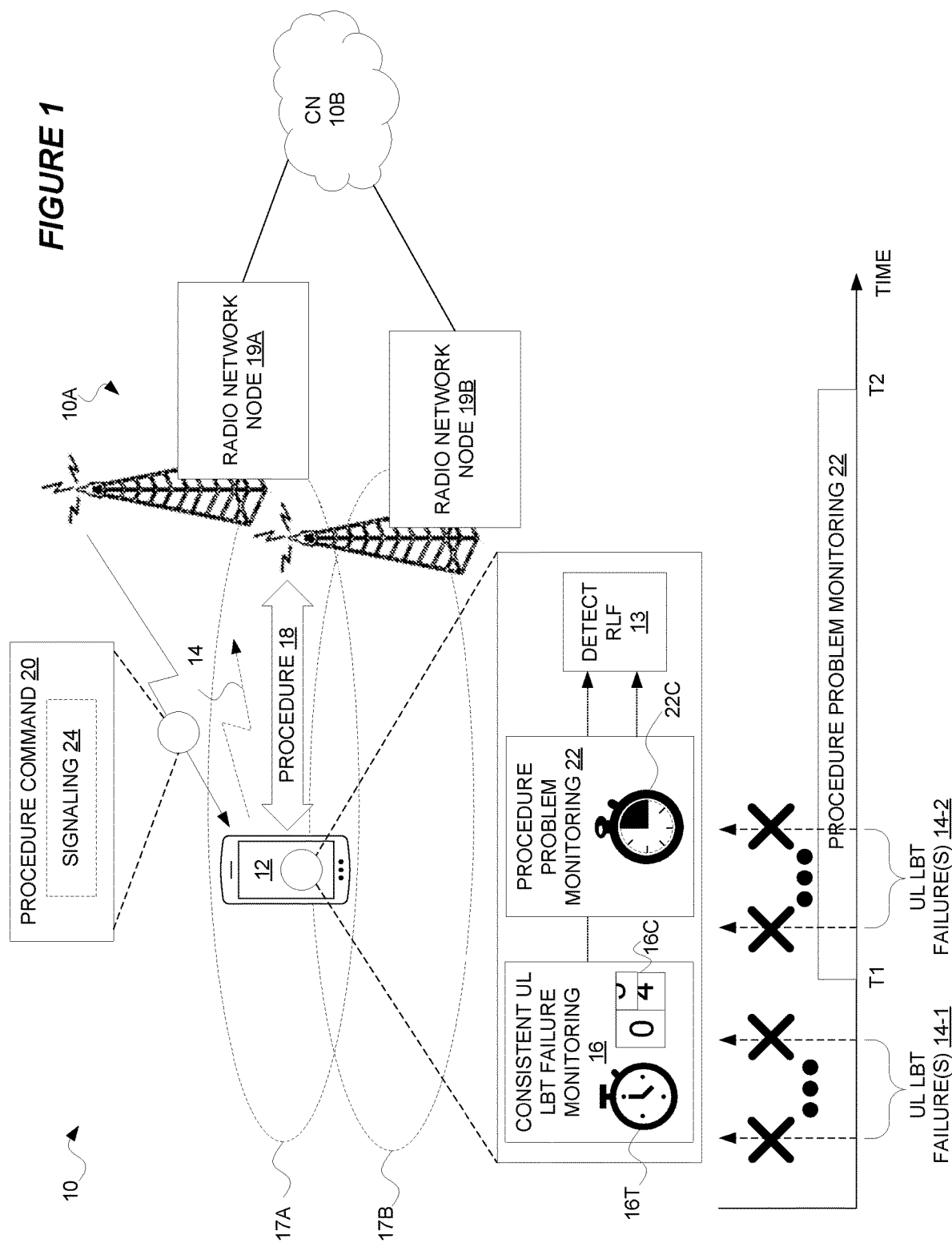
FIG. 1 is a block diagram of a wireless communication network according to some embodiments.

FIG. 1 shows a wireless communication system 10 according to some embodiments. The system 10 includes a radio access network (RAN) 10A and a core network (CN) 10B. The RAN 10A provides radio access to one or more wireless devices (e.g., user equipment, UE) and connects the wireless device(s) to the CN 10B. The CN 10B in turn connects the wireless device(s) to one or more data networks, e.g., the Internet.

FIG. 1 in particular shows a wireless device 12. The wireless device 12 may be configured to wirelessly communicate with one or more radio network nodes in the RAN 10A. The wireless device 12 in this regard may transmit communications to the radio network node(s) over an uplink and may receive communications from the radio network node(s) over a downlink. In some embodiments, the wireless device 12 operates in unlicensed frequency spectrum. The wireless device 12 in this regard may be required to successfully complete a listen-before-talk (LBT) procedure before performing an uplink (UL) transmission 14, e.g., to make sure the channel is clear before performing an UL transmission 14.

In this context, the wireless device 12 in some embodiments monitors the uplink for radio link failure (RLF). Radio link failure in some embodiments is a failure of the uplink at a lower layer of a protocol stack for the uplink. In some embodiments, once the wireless device 12 considers RLF to have been detected, the wireless device 12 may release the uplink and/or attempt to re-establish the uplink from scratch.

The wireless device 12 is configured to consider RLF to be detected 13 upon detecting any number of problems which the wireless device 12 monitors in parallel. One problem that may generally cause the wireless device 12 to consider RLF to be detected is so-called consistent UL LBT failure. Consistent UL LBT failure occurs when UL LBT failures happen consistently. Here, an UL LBT failure may happen when the UL LBT procedure, that the wireless device 12 performs as a prerequisite to an uplink transmission 14, fails, i.e., because the channel is detected as already occupied. In some embodiments, the UL LBT failures that contribute to the wireless device 12 detecting consistent UL LBT failure include UL LBT failures for any type of uplink transmission, e.g., including multiple different types such as a sounding reference signal transmission, a control channel transmission, a data channel transmission, and/or a random access channel transmission.

Figure 2:
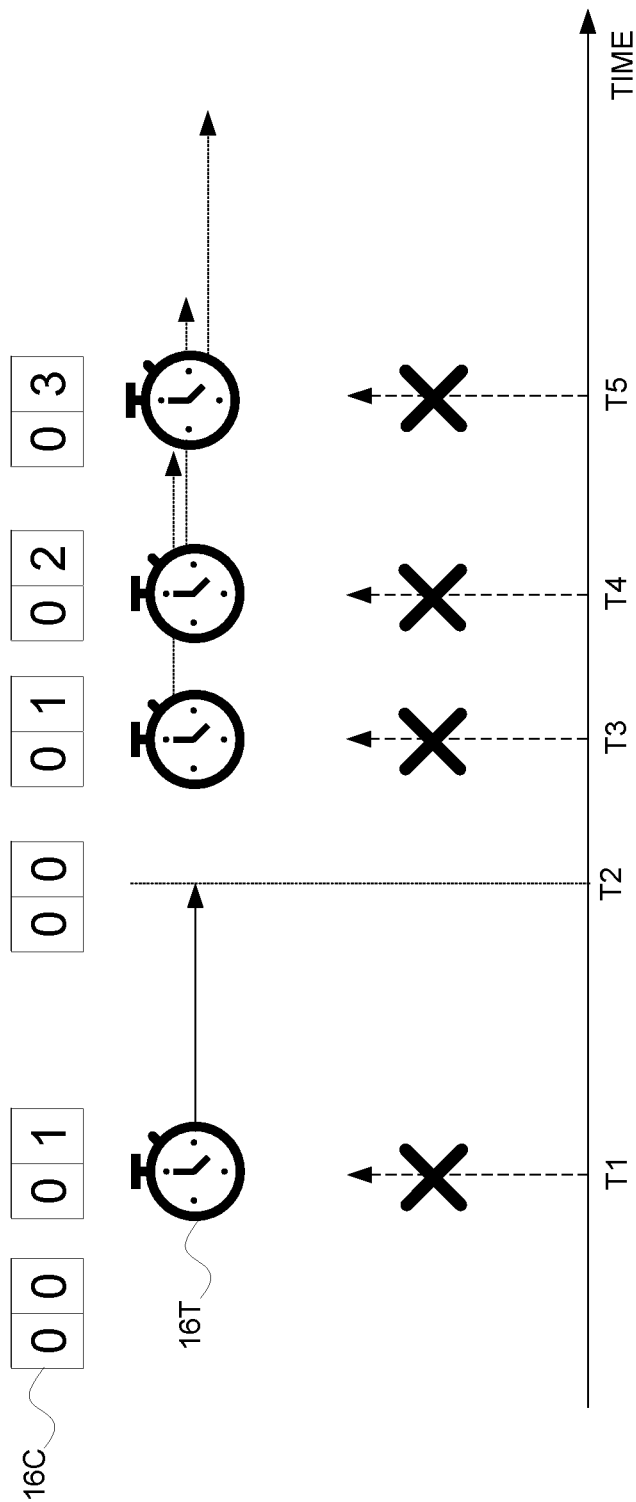
FIG. 2 is a block diagram of consistent uplink listen-before-talk detection according to some embodiments.

More particularly in this regard, FIG. 1 shows the wireless device 12 as performing consistent UL LBT failure monitoring 16. Such consistent UL LBT failure monitoring 16 is shown as employing the use of a timer 16T and a counter 16C. The counter 16C may be referred to as an UL LBT failure counter, and the timer 16T may be referred to as the inter-failure duration timer 16T. The wireless device 12 uses the UL LBT failure counter 16C to count the number of UL LBT failures that occur, e.g., across all types of uplink transmissions. The wireless device 12 uses the inter-failure duration timer 16T to reset the counter 16C when the UL LBT failures are not consistent, e.g., when no UL LBT failure occurs for at least a threshold amount of time. The UL LBT failure counter 16C and the inter-failure duration timer 16T may thereby be said to supervise consistent UL LBT failure. FIG. 2 shows one example.

As shown in FIG. 2, the wireless device 12 detects an UL LBT failure at time T1. Upon the occurrence of this UL LBT failure at time T1, the wireless device 12 increments the UL LBT failure counter 16C from 00 to 01 and starts (or re-starts) the inter-failure duration timer 16T. In this example, the inter-failure duration timer 16T expires at time T2, since no other UL LBT failure occurs between time T1 and T2. Upon expiration of the inter-failure duration timer 16T, the wireless device 12 resets the UL LBT failure counter 16C to 00. However, at time T3, the wireless device 12 detects another UL LBT failure. Upon the occurrence of this UL LBT failure at time T3, the wireless device 12 increments the UL LBT failure counter 16C from 00 to 01 and starts (or re-starts) the inter-failure duration timer 16T. Before the inter-failure duration timer 16T can expire, yet another UL LBT failure occurs at time T4. The wireless device 12 accordingly increments the UL LBT failure counter 16C from 01 to 02, i.e., to record that the number of consistent UL LBT failures is 2. The wireless device 12 also restarts the inter-failure duration timer 16T. Before the inter-failure duration timer 16T can expire this time, still another UL LBT failure occurs at time T5. The wireless device 12 accordingly increments the UL LBT failure counter 16C from 02 to 03, i.e., to record that the number of consistent UL LBT failures is 3. The wireless device 12 also restarts the inter-failure duration timer 16T. This process may continue until the UL LBT failure counter 16C reaches a threshold. Once the UL LBT failure counter 16C reaches the threshold, the wireless device 12 may consider itself as having detected consistent UL LBT failure.

Generally, the wireless device 12 may consider RLF to be detected 13 upon detecting consistent UL LBT failure according to such monitoring 16. However, the wireless device 12 may also consider RLF to be detected 13 upon detecting a problem with a certain procedure 18. The certain procedure 18 may for instance be a random access procedure, a handover procedure, a cell change procedure, or any procedure that involves the wireless device 12 performing uplink transmission(s) for which uplink LBT is required.

FIG. 1 for example shows that the wireless device 12 may receive a command 20 from a radio network node 19A to handover from a serving cell 17A to a target cell 17B, e.g., which may be provided by the same radio network node 19A or a different radio network node 19B. The command may be unconditional or conditional. Either unconditionally or upon the fulfilment of a condition, the wireless device 12 may thereafter perform the certain procedure 18 in the form of a handover procedure, e.g., with the same radio network node 19A or a different radio network node 19B. In some embodiments, this handover procedure includes a random access procedure by which the wireless device 12 performs one or more uplink transmissions, e.g., Msg1 and/or Msg3.

In these and other examples, the wireless device 12 may detect a problem with the certain procedure 18 on the basis of criteria other than UL LBT failure. For instance, the wireless device 12 as shown performs procedure problem monitoring 22. Such monitoring 22 is shown as employing the use of a timer 22C, e.g., which may be referred to as timer T304 where the procedure 18 is a handover procedure or a random access procedure. The wireless device 12 may start the timer 22C at the start of or during the procedure 18, e.g., upon receiving the handover command 20. The wireless device 12 may stop the timer 22C when the procedure 18 completes successfully. If the timer 22C expires before the procedure 18 completes successfully, the wireless device 12 considers a problem with the procedure 18 as having occurred. That is, the problem with the procedure 18 occurs if the procedure 18 fails to complete successfully within the timer's duration. The timer 22C may therefore be said to supervise successful completion of the procedure 18.

No matter how exactly implemented, the wireless device 12 performs consistent UL LBT failure monitoring 16 in parallel with procedure problem monitoring 22. That is, the wireless device 12 monitors for RLF due to consistent uplink LBT failure in parallel with monitoring for RLF due to a problem with the certain procedure 18.

Notably, because the procedure 18 involves one or more uplink transmissions by the wireless device 12, a problem with the procedure 18 may occur because of UL LBT failure. For example, UL LBT failure may cause the procedure 18 to fail to complete successfully before the timer 22C expires. Under some circumstances, then, UL LBT failure could cause the wireless device 12 to detect consistent LBT failure (via monitoring 16) and to also detect a problem with the procedure 18 (via monitoring 22). Some embodiments herein nonetheless account for this so that the wireless device 12 will detect RLF 13 only once (due to detecting a problem with the procedure 18), rather than detecting RLF 13 twice (once due to detecting a problem with the procedure 18 and once due to detecting consistent LBT failure). Some embodiments may thereby advantageously avoid triggering redundant or overlapping RLF events, and/or avoid interrupting the procedure due to detecting consistent LBT failure.

More particularly, the wireless device 12 may facilitate the coexistence of these parallel RLF detection mechanisms 16, 22 in any number of ways. In one embodiment, for example, the wireless device 12 performs monitoring 16 for consistent UL LBT failure even while monitoring 22 for a problem with the certain procedure 18 (i.e., in parallel). For example, in this case, the wireless device 12 continues to operate timer 16T and counter 16C as described above, even while monitoring 22 for a problem with the certain procedure 18. But, the wireless device 12 does not consider RLF to be detected 13 if the wireless device 12 is monitoring 22 for a problem with the procedure 18 when monitoring 16 detects consistent UL LBT failure. That is, the wireless device 12 considers RLF to be detected upon detecting consistent uplink LBT failure, only if the wireless device 12 was not monitoring for a problem with the certain procedure 18 when the consistent uplink LBT failure was detected.

For example, where the running of timer 22C indicates the wireless device 12 is monitoring 22 for a problem with the procedure 18, the wireless device 12 may consider or not consider RLF to be detected 13 due to detecting consistent UL LBT failure, depending respectively on whether the timer 22C is not or is running when consistent uplink LBT failure is detected. Accordingly, upon detecting consistent UL LBT failure while the timer 22C is not running, the wireless device 12 may consider RLF to be detected due to detecting consistent uplink LBT failure. But upon detecting consistent UL LBR failure while the timer 22C is running, the wireless device 12 may not consider RLF to be detected due to detecting consistent LBT failure.

Consider a simple example shown in FIG. 1. As shown, consistent UL LBT failure monitoring 16 detects UL LBT failures 14-1, e.g., which may be for any type of uplink transmissions before the procedure 18 starts. These UL LBT failures 14-1 may thereby contribute towards consistent UL LBT failure (e.g., increasing the UL LBT failure counter 16C), but not yet trigger consistent UL LBT failure (e.g., the counter 16C has not yet reached its threshold). At time T1, procedure problem monitoring 22 starts, e.g., the timer 22C is started upon the start of or during the procedure 18. While monitoring 22 for a problem with the procedure 18, additional UL LBT failures 14-2 occur, e.g., for uplink transmission(s) involved in the procedure 18. As a result, consistent UL LBT failure monitoring 16 detects consistent UL LBT failure (e.g., the counter 16C reaches its threshold). However, according to some embodiments herein, despite consistent UL LBT failure being detected, the wireless device 12 does not consider RLF to be detected due to this consistent UL LBT failure, because the wireless device 12 is already monitoring for a problem with the certain procedure 18 when that consistent UL LBT failure is detected. Indeed, in this example, the UL LBT failures 14-2 may very well cause the procedure 18 to fail to complete successfully by time T2, at which point procedure problem monitoring 22 will detect a problem with the procedure 18 and trigger the wireless device 12 to detect RLF. In this case, then, the wireless device 12 advantageously triggers only a single RLF event and avoids triggering redundant or overlapping RLF events. Moreover, the wireless device 12 avoids interrupting the procedure 18 due to detecting consistent LBT failure.

In other embodiments, the wireless device 12 suspends or stops monitoring 16 for consistent UL LBT failure while the wireless device is monitoring 22 for a problem with the certain procedure 18. This may mean that the wireless device 12 pauses or stops its UL LBT failure counter 16C and/or inter-failure duration timer 16T while monitoring 22 for a problem with the procedure 18. For example, the wireless device 12 may suspend or stop monitoring 16 for consistent UL LBT failure upon starting timer 22C and/or while timer 22C is running. In some embodiments, the wireless device 12 may resume or start monitoring 16 for consistent UL LBT failure when the wireless device 12 stops monitoring 22 for a problem with the certain procedure 18, e.g., when the procedure 18 completes or when the timer 22C stops.

Note that in some embodiments the wireless device's parallel handling of monitoring 16 and monitoring 22 is configurable by the network. The wireless device 12 may for instance receive signaling 24 indicating whether, or that, the wireless device 12 is to behave as described above. For example, the signaling 24 may indicate whether, or that, the wireless device 12 is to not consider RLF to be detected if the wireless device 12 detects consistent UL LBT failure while monitoring 22 for a problem with the certain procedure 18. Or, the signaling 24 may indicate whether, or that, the wireless device 12 is to suspend or stop monitoring 16 for consistent uplink LBT failure while monitoring 22 for a problem with the certain procedure 18. Either way, the signaling 24 may be included in a command 20 to perform the certain procedure 18 (as shown) or in a command to perform the certain procedure 18 upon fulfillment of a condition. In other embodiments now shown, the signaling 24 may be included in System Information, in Radio Resource Control signaling, in DCI signaling, or the like.

Note further that, in some embodiments, the wireless device 12 may indicate to the network 10 that consistent UL LBT failure was the cause of the procedure 18 failing to complete successfully and/or the cause of the wireless device 12 requesting connection re-establishment. For example, upon procedure problem monitoring 22 detecting RLF due to detecting a problem with the procedure 18, the wireless device 12 may transmit a request for connection re-establishment to the network, e.g., to radio network node 19B. In some embodiments, the wireless device 12 indicates in the request that the cause of the request is consistent uplink LBT failure. The wireless device 12 may do so for instance if the wireless device 12 detected consistent UL LBT failure while monitoring 22 for a problem with the procedure 18.

Figure 3:
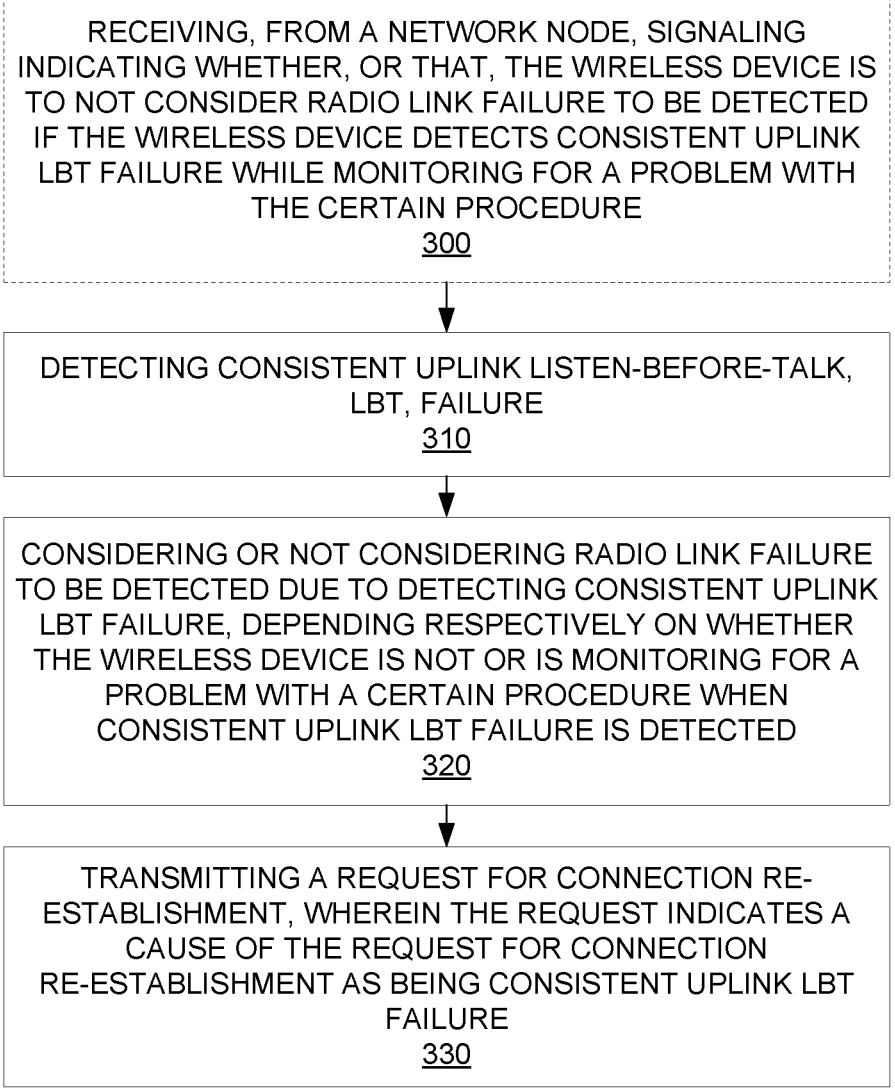
FIG. 3 is a logic flow diagram of a method performed by a wireless device according to some embodiments.

In view of the modifications and variations herein, FIG. 3 depicts a method performed by a wireless device 12 in accordance with particular embodiments. The method includes detecting consistent uplink listen-before-talk, LBT, failure (Block 310). The method also comprises considering or not considering radio link failure to be detected due to detecting consistent uplink LBT failure, depending respectively on whether the wireless device 12 is not or is monitoring for a problem with a certain procedure 18 when consistent uplink LBT failure is detected (Block 320).

In some embodiments, the method also comprises receiving, from a network node, signaling 24 indicating whether, or that, the wireless device 12 is to not consider radio link failure to be detected if the wireless device 12 detects consistent uplink LBT failure while monitoring for a problem with the certain procedure 18 (Block 300).

Alternatively or additionally, the method may further comprise transmitting a request for connection re-establishment, wherein the request indicates a cause of the request for connection re-establishment as being consistent uplink LBT failure (Block 330).

In some embodiments, monitoring for a problem with the certain procedure 18 comprises starting a timer at the beginning of or during the certain procedure 18 and monitoring for expiration of the timer. In this case, expiration of the timer indicates a problem with the certain procedure 18, and considering or not considering radio link failure comprises considering or not considering radio link failure to be detected due to detecting consistent uplink LBT failure, depending respectively on whether the timer is not or is running when consistent uplink LBT failure is detected.

In some embodiments, a timer at the wireless device 12 is configured to be started at the beginning of or during the certain procedure 18 and stopped upon successful completion of the certain procedure 18, and monitoring for a problem with the certain procedure 18 comprises monitoring for expiration of the timer. In this case, expiration of the timer indicates a problem with the certain procedure 18, and considering or not considering radio link failure comprises, upon detecting consistent uplink LBT failure while the timer is not running, considering radio link failure to be detected due to detecting consistent uplink LBT failure.

In some embodiments, considering or not considering radio link failure comprises considering radio link failure to be detected due to detecting consistent uplink LBT failure, if the wireless device 12 is not monitoring for a problem with the certain procedure 18 when consistent uplink LBT failure is detected.

In some embodiments, considering or not considering radio link failure comprises not considering radio link failure to be detected due to detecting consistent uplink LBT failure, if the wireless device 12 is monitoring for a problem with the certain procedure 18 when consistent uplink LBT failure is detected.

In some embodiments, the method further comprises responsive to detecting consistent uplink LBT failure while the wireless device 12 is not monitoring for a problem with the certain procedure 18, resetting a counter and/or a timer that supervises consistent uplink LBT failure.

In some embodiments, the method further comprises monitoring for a problem with the certain procedure 18. The method further comprises, based on said monitoring, detecting a problem with the certain procedure 18. The method further comprises, responsive to said detecting the problem with the certain procedure 18, considering radio link failure to be detected. In other embodiments, the method further comprises, responsive to radio link failure being detected, transmitting a request for connection re-establishment, wherein the request indicates a cause of the request for connection re-establishment as being consistent uplink LBT failure. In other embodiments, the method further comprises, responsive to radio link failure being detected, performing cell selection to select a cell on which to camp. The method further comprises performing a conditional handover procedure 18 or a connection re-establishment procedure towards the selected cell, depending respectively on whether or not the selected cell is a conditional handover candidate. In still other embodiments, performing cell selection comprises selecting a cell, from among multiple candidate cells, that has a lowest measured channel occupancy or a lowest LBT failure ratio.

In some embodiments, the method further comprises transmitting a request for connection re-establishment, with the request indicating a cause of the request for connection re-establishment as being consistent uplink LBT failure.

In some embodiments, the method further comprises receiving, from a network node, signaling indicating whether, or that, the wireless device 12 is to not consider radio link failure to be detected if the wireless device 12 detects consistent uplink LBT failure while monitoring for a problem with the certain procedure 18. In other embodiments, the signaling is included in a command to perform the certain procedure 18 or in a command to perform the certain procedure 18 upon fulfillment of a condition.

In some embodiments, detecting consistent uplink LBT failure comprises detecting consistent uplink LBT failure in an active bandwidth part in a serving cell of the wireless device 12.

In some embodiments, the method further comprises, upon an occurrence of an uplink LBT failure, incrementing an uplink LBT failure counter and starting or restarting an inter-failure duration timer, In this case, the uplink LBT failure counter is to be reset to zero upon expiration of the inter-failure duration timer, and detecting consistent uplink LBT failure comprises detecting that the uplink LBT failure counter reaches or exceeds a threshold.

In some embodiments, the wireless device 12 is configured to consider radio link failure to be detected upon detecting the problem with the certain procedure 18.

In some embodiments, the problem with the certain procedure 18 is a problem that would trigger the wireless device 12 to consider radio link failure to be detected.

In some embodiments, the certain procedure 18 is a random access procedure, a handover procedure, or a cell change procedure.

In some embodiments, the signaling is included in a command to perform the certain procedure 18 or in a command to perform the certain procedure 18 upon fulfillment of a condition.

In some embodiments, the signaling is included in system information or in dedicated Radio Resource Control, RRC, signaling.

In some embodiments, the method further comprises, upon an occurrence of an uplink LBT failure, for any type of uplink transmission, incrementing an uplink LBT failure counter and starting or restarting an inter-failure duration timer, wherein the uplink LBT failure counter is to be reset to zero upon expiration of the inter-failure duration timer, and detecting consistent uplink LBT failure when the counter reaches or exceeds a threshold.

In some embodiments, the certain procedure 18 includes one or more uplink transmissions by the wireless device 12.

In some embodiments, uplink LBT failures that contribute to detecting consistent uplink LBT failure include uplink LBT failures for any of multiple different types of uplink transmissions.

In some embodiments, the multiple different types of uplink transmissions include a sounding reference signal transmission, a control channel transmission, a data channel transmission, and/or a random access channel transmission.

Figure 4:
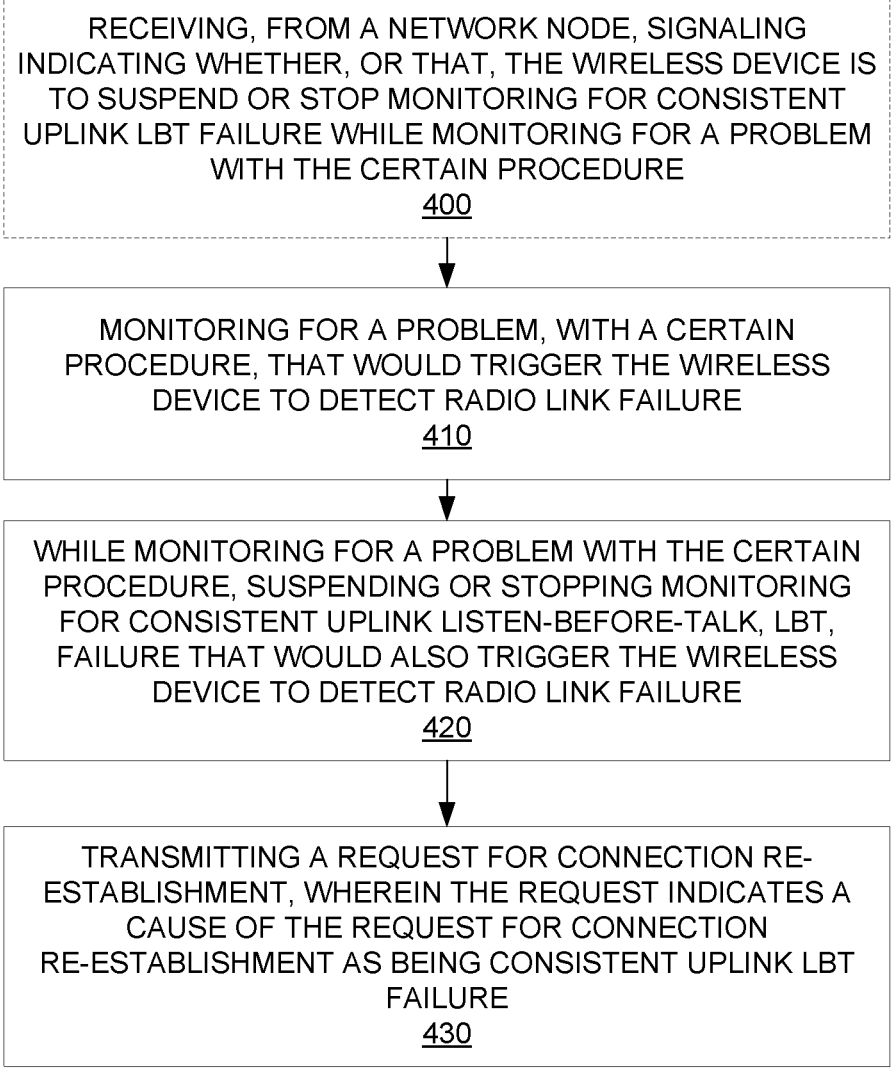
FIG. 4 is a logic flow diagram of a method performed by a wireless device according to other embodiments.

FIG. 4 depicts a method performed by a wireless device 12 in accordance with other particular embodiments. The method includes monitoring for a problem, with a certain procedure 18, that would trigger the wireless device 12 to detect radio link failure (Block 410). The method further comprises, while monitoring for a problem with the certain procedure 18, suspending or stopping monitoring for consistent uplink listen-before-talk, LBT, failure that would also trigger the wireless device 12 to detect radio link failure (Block 420).

In some embodiments, the method further comprises receiving, from a network node, signaling 24 indicating whether, or that, the wireless device 12 is to suspend or stop monitoring for consistent uplink LBT failure while monitoring for a problem with the certain procedure 18 (Block 400).

Alternatively or additionally, the method may further comprise transmitting a request for connection re-establishment, wherein the request indicates a cause of the request for connection re-establishment as being consistent uplink LBT failure (Block 430).

In some embodiments, the certain procedure 18 is a random access procedure, a handover procedure, or a cell change procedure.

In some embodiments, monitoring for a problem with the certain procedure 18 comprises starting a timer at the beginning of or during the certain procedure 18 and monitoring for expiration of the timer. In this case, expiration of the timer indicates a problem with the certain procedure 18, and suspending or stopping monitoring comprises suspending or stopping monitoring for consistent uplink LBT failure while the timer is running.

In some embodiments, a timer at the wireless device 12 is configured to be started at the beginning of or during the certain procedure 18 and stopped upon successful completion of the certain procedure 18. In this case, expiration of the timer indicates a problem with the certain procedure 18, and suspending or stopping monitoring comprises suspending or stopping monitoring for consistent uplink LBT failure upon starting the timer. In still other embodiments, the method also comprises resuming or starting monitoring for consistent uplink LBT failure upon stopping the timer.

In some embodiments, starting the timer comprises starting the timer upon receiving a mobility command, upon successfully completing an LBT procedure for transmission of a first message of the random access procedure, or upon applying a conditional mobility command.

In some embodiments, the timer supervises successful completion of the random access procedure, wherein expiration of the timer indicates the problem with the random access procedure.

In some embodiments, the method also comprises resuming or starting monitoring for consistent uplink LBT failure while not monitoring for a problem with the certain procedure 18.

In some embodiments, suspending or stopping monitoring for consistent uplink LBT failure comprises pausing or stopping a timer and/or a counter that supervises consistent uplink LBT failure.

In some embodiments, the method also comprises, based on monitoring for a problem with the certain procedure 18, detecting a problem with the certain procedure 18 when consistent uplink LBT failure is detected. The method also comprises, responsive to detecting the problem with the certain procedure 18, considering radio link failure to be detected.

In some embodiments, the method also comprises, responsive to radio link failure being detected, transmitting a request for connection re-establishment, wherein the request indicates a cause of the request for connection re-establishment as being consistent uplink LBT failure.

In some embodiments, the method also comprises, responsive to radio link failure being detected, performing cell selection to select a cell on which to camp. The method also comprises performing a conditional handover procedure or a connection re-establishment procedure towards the selected cell, depending respectively on whether or not the selected cell is a conditional handover candidate.

In some embodiments, performing cell selection comprises selecting a cell, from among multiple candidate cells, that has a lowest measured channel occupancy or a lowest LBT failure ratio.

In some embodiments, the method also comprises, transmitting a request for connection re-establishment, with the request indicating a cause of the request for connection re-establishment as being consistent uplink LBT failure.

In some embodiments, the method also comprises receiving, from a network node, signaling indicating whether, or that, the wireless device 12 is to suspend or stop monitoring for consistent uplink LBT failure while monitoring for a problem with the certain procedure 18. In still other embodiments, the signaling is included in a command to perform the certain procedure 18 or in a command to perform the certain procedure 18 upon fulfillment of a condition.

In some embodiments, monitoring for consistent uplink LBT failure comprises monitoring for consistent uplink LBT failure in an active bandwidth part in a serving cell of the wireless device 12.

In some embodiments, the method also comprises, upon an occurrence of an uplink LBT failure, incrementing an uplink LBT failure counter and starting or restarting an inter-failure duration timer. In this case, the uplink LBT failure counter is to be reset to zero upon expiration of the inter-failure duration timer, and detecting consistent uplink LBT failure comprises detecting that the uplink LBT failure counter reaches or exceeds a threshold.

In some embodiments, the signaling is included in a command to perform the certain procedure 18 or in a command to perform the certain procedure 18 upon fulfillment of a condition.

In some embodiments, the signaling is included in system information or in dedicated Radio Resource Control, RRC, signaling.

In some embodiments, the method further comprises, upon an occurrence of an uplink LBT failure, for any type of uplink transmission, incrementing an uplink LBT failure counter and starting or restarting an inter-failure duration timer, wherein the uplink LBT failure counter is to be reset to zero upon expiration of the inter-failure duration timer, and detecting consistent uplink LBT failure when the counter reaches or exceeds a threshold.

In some embodiments, the certain procedure 18 includes one or more uplink transmissions by the wireless device 12.

In some embodiments, uplink LBT failures that contribute to detecting consistent uplink LBT failure include uplink LBT failures for any of multiple different types of uplink transmissions.

In some embodiments, the multiple different types of uplink transmissions include a sounding reference signal transmission, a control channel transmission, a data channel transmission, and/or a random access channel transmission.

Figure 5:
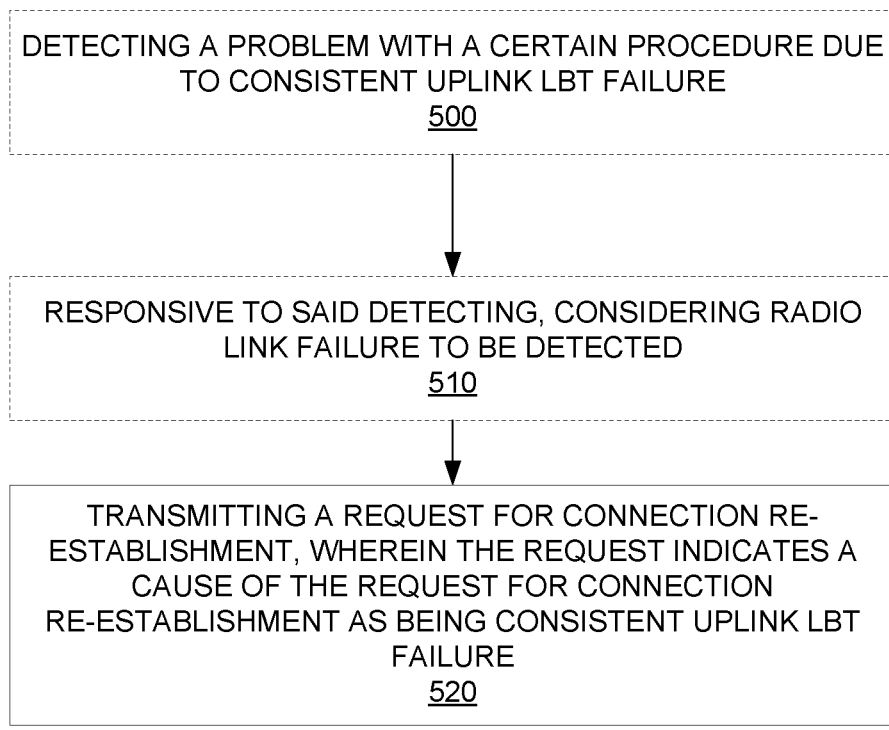
FIG. 5 is a logic flow diagram of a method performed by a wireless device according to still other embodiments.

FIG. 5 depicts a method performed by a wireless device 12 in accordance with other particular embodiments. The method includes transmitting a request for connection re-establishment, wherein the request indicates a cause of the request for connection re-establishment as being consistent uplink listen-before-talk, LBT, failure (Block 520).

In some embodiments, the method may also comprise detecting a problem with a certain procedure 18 due to consistent uplink LBT failure (Block 500). And, the method may also comprise, responsive to said detecting, considering radio link failure to be detected (Block 510). In this case, the request for connection re-establishment may be transmitted responsive to detection of radio link failure.

In some embodiments, the method also comprises detecting a problem with a certain procedure 18 due to consistent uplink LBT failure. The method also comprises, responsive to said detecting, considering radio link failure to be detected. In this case, the request for connection re-establishment is transmitted responsive to detection of radio link failure. In still other embodiments, the certain procedure 18 is a random access procedure, a handover procedure, or a cell change procedure.

In some embodiments, the signaling is included in a command to perform the certain procedure 18 or in a command to perform the certain procedure 18 upon fulfillment of a condition.

In some embodiments, the signaling is included in system information or in dedicated Radio Resource Control, RRC, signaling.

In some embodiments, the method further comprises, upon an occurrence of an uplink LBT failure, for any type of uplink transmission, incrementing an uplink LBT failure counter and starting or restarting an inter-failure duration timer, wherein the uplink LBT failure counter is to be reset to zero upon expiration of the inter-failure duration timer, and detecting consistent uplink LBT failure when the counter reaches or exceeds a threshold.

In some embodiments, the certain procedure 18 includes one or more uplink transmissions by the wireless device 12.

In some embodiments, uplink LBT failures that contribute to detecting consistent uplink LBT failure include uplink LBT failures for any of multiple different types of uplink transmissions.

In some embodiments, the multiple different types of uplink transmissions include a sounding reference signal transmission, a control channel transmission, a data channel transmission, and/or a random access channel transmission.

Figure 6:
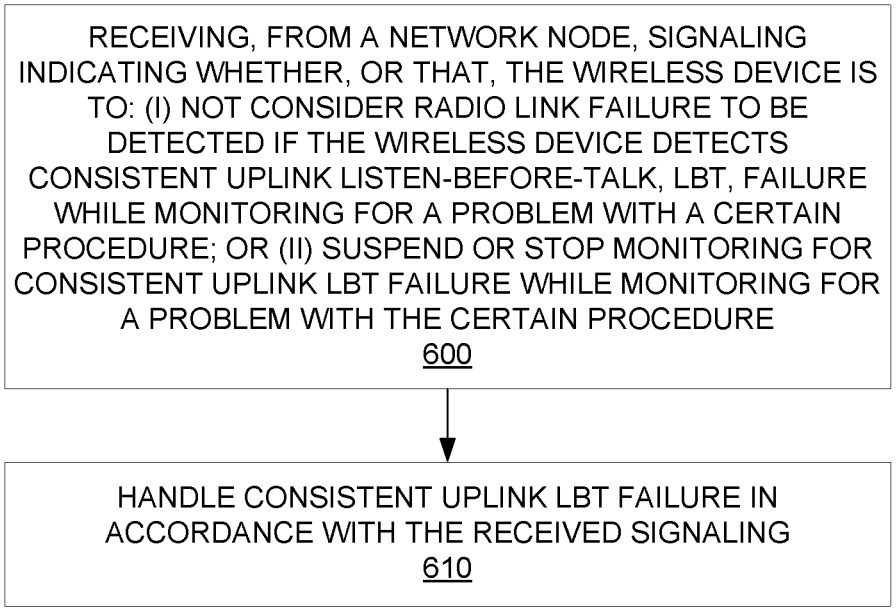
FIG. 6 is a logic flow diagram of a method performed by a wireless device according to yet other embodiments.

FIG. 6 depicts a method performed by a wireless device 12 in accordance with other particular embodiments. The method includes receiving, from a network node, signaling 24 indicating whether, or that, the wireless device 12 is to: (i) not consider radio link failure to be detected if the wireless device 12 detects consistent uplink listen-before-talk, LBT, failure while monitoring for a problem with a certain procedure 18; or (ii) suspend or stop monitoring for consistent uplink LBT failure while monitoring for a problem with the certain procedure 18 (Block 600).

In some embodiments, the method also comprises handling consistent uplink LBT failure in accordance with the received signaling (Block 610).

In some embodiments, the certain procedure 18 is a random access procedure, a handover procedure, or a cell change procedure.

In some embodiments, the signaling is included in a command to perform the certain procedure 18 or in a command to perform the certain procedure 18 upon fulfillment of a condition.

In some embodiments, the signaling is included in system information or in dedicated Radio Resource Control, RRC, signaling.

In some embodiments, the method further comprises, upon an occurrence of an uplink LBT failure, for any type of uplink transmission, incrementing an uplink LBT failure counter and starting or restarting an inter-failure duration timer, wherein the uplink LBT failure counter is to be reset to zero upon expiration of the inter-failure duration timer, and detecting consistent uplink LBT failure when the counter reaches or exceeds a threshold.

In some embodiments, the certain procedure 18 includes one or more uplink transmissions by the wireless device 12.

In some embodiments, uplink LBT failures that contribute to detecting consistent uplink LBT failure include uplink LBT failures for any of multiple different types of uplink transmissions.

In some embodiments, the multiple different types of uplink transmissions include a sounding reference signal transmission, a control channel transmission, a data channel transmission, and/or a random access channel transmission.

FIG. 7 depicts a method performed by a radio network node (e.g., radio network node 19A or 19B) in accordance with other particular embodiments. The method includes transmitting, to a wireless device 12, signaling 24 indicating whether, or that, the wireless device 12 is to: (i) not consider radio link failure to be detected if the wireless device 12 detects consistent uplink listen-before-talk, LBT, failure while monitoring for a problem with a certain procedure 18; or (ii) suspend or stop monitoring for consistent uplink LBT failure while monitoring for a problem with the certain procedure 18 (Block 700).

In some embodiments, the method also comprises handling consistent uplink LBT failure in accordance with the transmitted signaling (Block 710).

In some embodiments, the certain procedure 18 is a random access procedure, a handover procedure, or a cell change procedure.

In some embodiments, the signaling is included in a command to perform the certain procedure 18 or in a command to perform the certain procedure 18 upon fulfillment of a condition.

In some embodiments, the signaling is included in system information or in dedicated Radio Resource Control, RRC, signaling.

Figure 8:
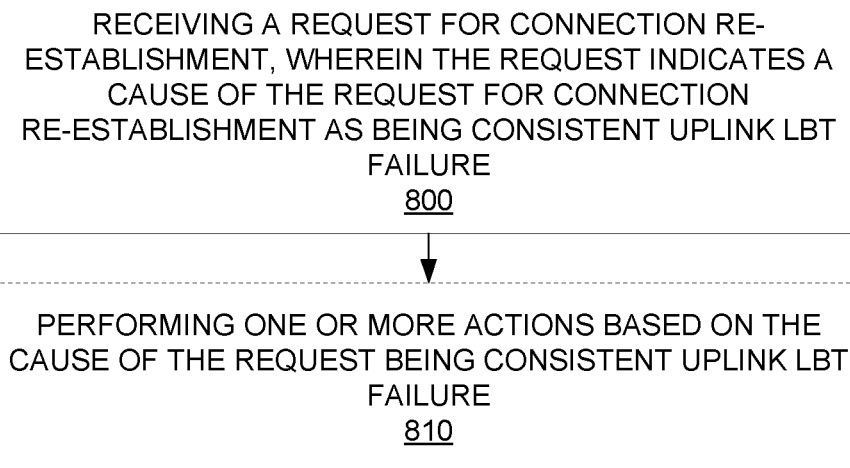
FIG. 8 is a logic flow diagram of a method performed by a radio network node according to other embodiments.

FIG. 8 depicts a method performed by a radio network node (e.g., radio network node 19A or 19B) in accordance with other particular embodiments. The method includes receiving, from a wireless device 12, a request for connection re-establishment, wherein the request indicates a cause of the request for connection re-establishment as being consistent uplink listen-before-talk, LBT, failure (Block 800).

In some embodiments, the method also comprises performing one or more actions based on the cause of the request being consistent uplink LBT failure (Block 810).

In some embodiments, the method further comprises initiating or performing a connection re-establishment procedure responsive to receiving the request.

Embodiments herein also include corresponding apparatuses. Embodiments herein for instance include a wireless device 12 configured to perform any of the steps of any of the embodiments described above for the wireless device 12.

Embodiments also include a wireless device 12 comprising processing circuitry and power supply circuitry. The processing circuitry is configured to perform any of the steps of any of the embodiments described above for the wireless device 12. The power supply circuitry is configured to supply power to the wireless device 12.

Embodiments further include a wireless device 12 comprising processing circuitry. The processing circuitry is configured to perform any of the steps of any of the embodiments described above for the wireless device 12. In some embodiments, the wireless device 12 further comprises communication circuitry.

Embodiments further include a wireless device 12 comprising processing circuitry and memory. The memory contains instructions executable by the processing circuitry whereby the wireless device 12 is configured to perform any of the steps of any of the embodiments described above for the wireless device 12.

Embodiments moreover include a user equipment (UE). The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to perform any of the steps of any of the embodiments described above for the wireless device 12. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a radio network node (e.g., radio network node 19A or 19B) configured to perform any of the steps of any of the embodiments described above for the radio network node.

Embodiments also include a radio network node (e.g., radio network node 19A or 19B) comprising processing circuitry and power supply circuitry. The processing circuitry is configured to perform any of the steps of any of the embodiments described above for the radio network node. The power supply circuitry is configured to supply power to the radio network node.

Embodiments further include a radio network node (e.g., radio network node 19A or 19B) comprising processing circuitry. The processing circuitry is configured to perform any of the steps of any of the embodiments described above for the radio network node. In some embodiments, the radio network node further comprises communication circuitry.

Embodiments further include a radio network node (e.g., radio network node 19A or 19B) comprising processing circuitry and memory. The memory contains instructions executable by the processing circuitry whereby the radio network node is configured to perform any of the steps of any of the embodiments described above for the radio network node.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 9:
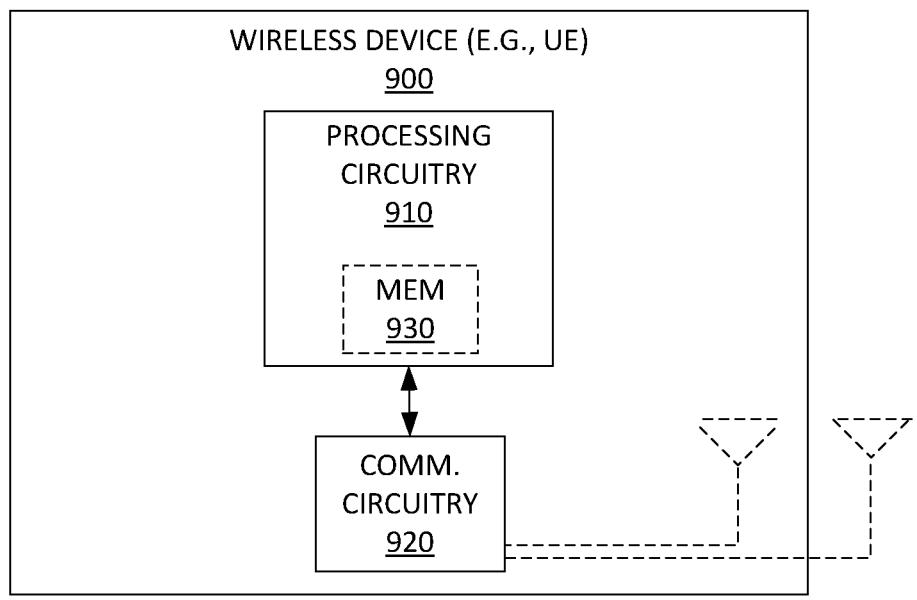
FIG. 9 is a block diagram of a wireless device according to some embodiments.

FIG. 9 for example illustrates a wireless device 900 (e.g., wireless device 12) as implemented in accordance with one or more embodiments. As shown, the wireless device 900 includes processing circuitry 910 and communication circuitry 920. The communication circuitry 920 (e.g., radio circuitry) is configured to transmit and/or receive information to and/or from one or more other nodes, e.g., via any communication technology. Such communication may occur via one or more antennas that are either internal or external to the wireless device 900. The processing circuitry 910 is configured to perform processing described above, such as by executing instructions stored in memory 930. The processing circuitry 910 in this regard may implement certain functional means, units, or modules.

Figure 10:
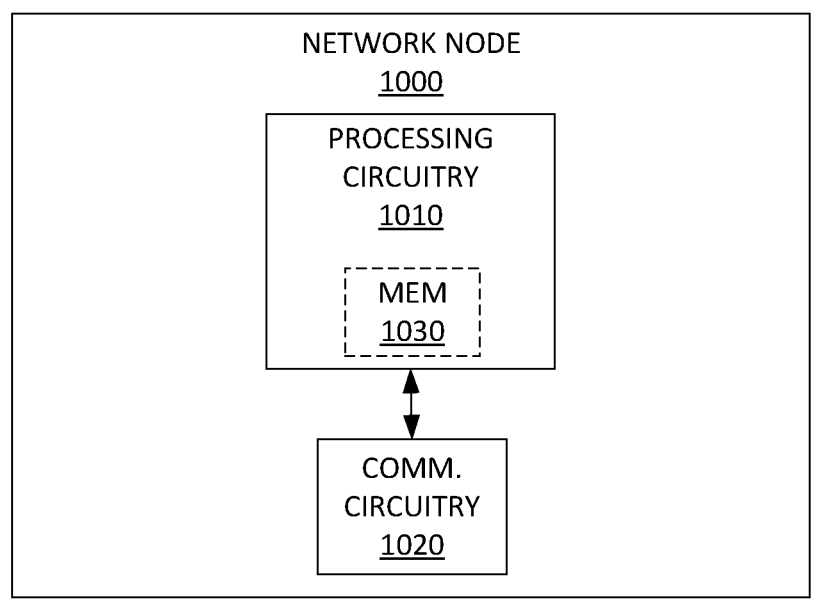
FIG. 10 is a block diagram of a radio network node according to some embodiments.

FIG. 10 illustrates a network node 1000 (e.g., radio network node 19A or 19B) as implemented in accordance with one or more embodiments. As shown, the network node 1000 includes processing circuitry 1010 and communication circuitry 1020. The communication circuitry 1020 is configured to transmit and/or receive information to and/or from one or more other nodes, e.g., via any communication technology. The processing circuitry 1010 is configured to perform processing described above, such as by executing instructions stored in memory 1030. The processing circuitry 1010 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Some embodiments herein are applicable in the 5th generation of cellular system, called New Radio (NR), that is being standardized in 3GPP. NR is developed for maximum flexibility to support multiple and substantially different use cases. Besides the typical mobile broadband use case, also machine type communication (MTC), ultra-low latency critical communications (URLCC), side-link device-to-device (D2D) and several other use cases too.

In NR, the basic scheduling unit is called a slot. A slot consists of 14 Orthogonal Frequency Division Multiplexing (OFDM) symbols for the normal cyclic prefix configuration. NR supports many different subcarrier spacing configurations and at a subcarrier spacing of 30 kHz the OFDM symbol duration is ~33 us. As an example, a slot with 14 symbols for the same subcarrier-spacing (SCS) is 500 us long (including cyclic prefixes).

NR also supports flexible bandwidth configurations for different user equipments (UEs) on the same serving cell. In other words, the bandwidth monitored by a UE and used for its control and data channels may be smaller than the carrier bandwidth. One or multiple bandwidth part configurations for each component carrier can be semi-statically signaled to a UE, where a bandwidth part consists of a group of contiguous Physical Resource Blocks (PRBs). Reserved resources can be configured within the bandwidth part. The bandwidth of a bandwidth part equals to or is smaller than the maximal bandwidth capability supported by a UE.

NR is targeting both licensed and unlicensed bands, where NR targeting unlicensed bands is referred to as NR-U. Allowing unlicensed networks, i.e., networks that operate in shared spectrum (or unlicensed spectrum) to effectively use the available spectrum, is an attractive approach to increase system capacity. Although unlicensed spectrum does not match the qualities of the licensed regime, solutions that allow an efficient use of it as a complement to licensed deployments have the potential to bring great value to the 3GPP operators, and, ultimately, to the 3GPP industry as a whole. It is expected that some features in NR will need to be adapted to comply with the special characteristics of the unlicensed band as well as also different regulations. A subcarrier spacing of 15 or 30 kHz are the most promising candidates for NR-U OFDM numerologies for frequencies below 6 GHz.

When operating in unlicensed spectrum, many regions in the world require a device to sense the medium as free before transmitting, This operation is often referred to as listen-before-talk or LBT for short. There are many different flavors of LBT, depending on which radio technology the device uses and which type of data it wants to transmit at the moment. Common for all flavors is that the sensing is done in a particular channel (corresponding to a defined carrier frequency) and over a predefined bandwidth. For example, in the 5 GHz band, the sensing is done over 20 MHz channels.

Many devices are capable of transmitting (and receiving) over a wide bandwidth including of multiple sub-bands/channels, e.g., LBT sub-band (i.e., the frequency part with bandwidth equal to LBT bandwidth). A device is only allowed to transmit on the sub-bands where the medium is sensed as free. Again, there are different flavors of how the sensing should be done when multiple sub-bands are involved.

In principle, there are two ways a device can operate over multiple sub-bands. One way is that the transmitter/receiver bandwidth is changed depending on which sub-bands that were sensed as free. In this setup, there is only one component carrier (CC) and the multiple sub-bands are treated as a single channel with a larger bandwidth. The other way is that the device operates almost independent processing chains for each channel. Depending on how independent the processing chains are, this option can be referred to as either carrier aggregation (CA) or dual connectivity (DC).

Consider now a channel access procedure in NR unlicensed spectrum (NR-U). Listen-before-talk (LBT) is designed for unlicensed spectrum co-existence with other radio access technologies (RATs). In this mechanism, a radio device applies a clear channel assessment (CCA) check (i.e. channel sensing) before any transmission. The transmitter involves energy detection (ED) over a time period compared to a certain threshold (ED threshold) in order to determine if a channel is idle. In case the channel is determined to be occupied, the transmitter performs a random back-off within a contention window before the next CCA attempt. In order to protect the ACK transmissions, the transmitter must defer a period after each busy CCA slot prior to resuming back-off. As soon as the transmitter has grasped access to a channel, the transmitter is only allowed to perform transmission up to a maximum time duration (namely, the maximum channel occupancy time (MOOT)). For quality of service (QoS) differentiation, a channel access priority based on the service type has been defined. For example, there are four LBT priority classes are defined for differentiation of contention window sizes (CWS) and MOOT between services.

Prior to any transmission in the uplink, the UE may need to perform the LBT operation to grasp the channel. For instance, the Medium Access Control (MAC) layer initiates a transmission, the MAC layer requests the Physical (PHY) layer to initiate the LBT operation, and the PHY layer further sends an indicator to the MAC indicating the LBT outcome (i.e., success or failure).

Consider now Radio Link monitoring in LTE and NR licensed. One of the main intentions of the Radio Link Failure (RLF) procedure in Long Term Evolution (LTE) was to assist the UE to perform a fast and reliable recovery without going via RRC_IDLE. It is beneficial to avoid unnecessary latency due to the Random Access Channel (RACH) access and Radio Resource Control (RRC) connection establishment from RRC IDLE.

In LTE, there are several reasons that may lead to the radio link failure. One reason is expiry of Timer T310. In particular, while the UE is in RRC connected mode, the UE monitors the downlink radio channel quality based on the downlink reference symbol. The UE compares the measured downlink channel quality with the out-of-sync and in-sync thresholds, Qout and Qin respectively. The physical channel evaluates the downlink channel quality, periodically sends indication an out-of-sync or in-sync indication, to layer 3. The UE layer 3 then evaluates if there is radio link failure based on the in-sync and out-of-sync indications, as output from the layer 3 filter. When the consecutively received out-of-sync indications are beyond the counter N310, a timer T310 is started. While T310 is running, the radio link is considered to be recovered if the UE consecutively receives N311 in-sync indications from the physical layer. By contrast, when the timer T310 is expired, a radio link failure is declared by the UE.

Another reason that may lead to RLF is that a maximum number of RLC retransmissions in the uplink is reached.

Yet another reason that may lead to RLF is handover failure and expiry of timer T304. In this regard, during a handover procedure, a timer T304 is started when the UE receives a handover command from the source cell. The value of the timer T304 should be set to allow the UE to try the maximum RACH access attempts to the target cell. When the timer T304 is expired, a radio link failure due to handover is detected.

When a radio link failure is triggered, the radio connection re-establishment is triggered. A UE shall first perform cell search to determine the best cell for radio link re-establishment. According to 3GPP TS 36.300 v15.7.0, a UE can select the same cell, a different cell from the same eNB, or a prepared cell from a different eNB, wherein the activity can be resumed (i.e., the UE stays in connected mode) via a radio connection re-establishment procedure since the previous UE context can be retrieved by inter-cell communication. However, when a prepared cell is not available, the UE selects an unprepared cell. In this case, the UE has to go to idle mode and try to setup the radio connection afterwards. In this case, activity of the UE cannot be resumed. Table 10.1.6-1 from 3GPP TS 36.300 v15.7.0 guides the UE behavior for target cell selection.

TABLE 1

Table 10.1.6-1 in the 3GPP TS 36.300 V 15.7.0

| Cases | First Phase | Second Phase |
|---|---|---|
| UE returns to the same cell | Continue as if no radio problems occurred | Activity is resumed by means of explicit signalling between UE and eNB |
| UE selects a different cell from the same eNB | N/A | Activity is resumed by means of explicit signalling between UE and eNB |
| UE selects a cell of a prepared eNB (NOTE) | N/A | Activity is resumed by means of explicit signalling between UE and eNB |
| UE selects a cell of a different eNB that is not prepared (NOTE) | N/A | Go via RRC_IDLE |

(NOTE):
a prepared eNB is an eNB which has admitted the UE during an earlier executed HO preparation phase, or obtains the UE context during the Second Phase.

Figure 11:
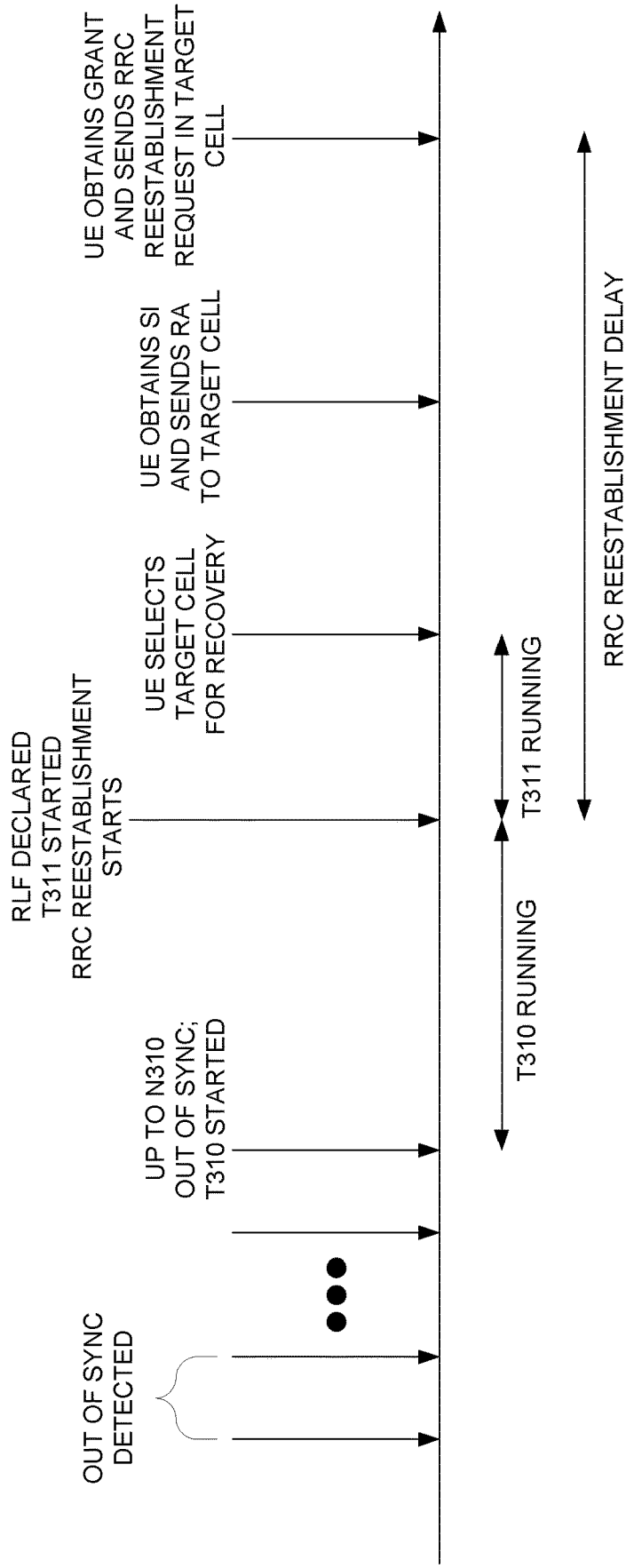
FIG. 11 is a block diagram of radio link monitoring according to some embodiments.

FIG. 11 illustrates one example of the radio link monitoring of the serving cell followed by RRC re-establishment to the target cell in LTE. As shown in the example of FIG. 11, when a certain number (N310) of out-of-sync indications are received from a lower layer, a timer T310 is started. Upon expiry of the T310 timer, RLF is declared, a timer T311 is started, and RRC Re-establishment starts. In this regard, the UE selects a target cell for recovery, obtains system information (SI), sends a random access to the selected target cell, obtains a grant, and sends an RRC Re-establishment request in the target cell.

Consider now the beam failure recovery procedure in NR. In NR, the MAC entity may be configured by RRC with a beam failure recovery procedure which is used for indicating to the serving gNB of a new Synchronization Signal Block (SSB) or Channel State Information (CSI) Reference Signal (RS) (CSI-RS) when beam failure is detected on the serving SSB(s)/CSI-RS(s). Beam failure is detected by counting beam failure instance indication from the lower layers to the MAC entity.

The MAC entity shall:
1> if beam failure instance indication has been received from lower layers:
2> start or restart the beamFailureDetectionTimer;
2> increment BFI_COUNTER by 1;
2> if BFI_COUNTER>=beam FailureInstanceMax-Count:
3> if beam FailureRecoveryConfig is configured:
4> start the beamFailureRecoveryTimer, if configured;
4> initiate a Random Access procedure the SpCell by applying the parameters powerRampingStep, preambleReceivedTargetPower, and preambleTransMax configured in beam FailureRecoveryConfig.
3> else:
4> initiate a Random Access procedure the SpCell.
1> if the beamFailureDetectionTimer expires:
2> set BFI_COUNTER to 0.
1> if the Random Access procedure is successfully completed
2> stop the beamFailureRecoveryTimer, if configured;
2> consider the Beam Failure Recovery procedure successfully completed.

Consider now consistent UL LBT failure handling according to some embodiments. The Layer 2 (L2) LBT failure mechanism will take into account any LBT failure regardless of UL transmission type. The UL LBT failure mechanism will have the same recovery mechanism for all failures regardless of UL transmission type. UL LBT failures are detected per bandwidth part (BWP). The UE will report the occurrence of consistent UL LBT failures on PSCell and SCells. Here, PSCell refers to the primary cell of a secondary cell group (SCG) in multi-connectivity, e.g., dual connectivity. And SCells refer to cells in the SCG. The assumption is to reuse SCell failure reporting for beam failure (BF).

A "threshold" for the maximum number of LBT failures which triggers the "consistent" LBT failure event may be used. Both a timer and a counter may be used, where the counter is reset when the timer expires and incremented when UL LBT failure happens, e.g., as exemplified in FIG. 2. The timer may be started/restarted when UL LBT failure occurs.

Accordingly, a mechanism may be defined at the MAC layer to handle consistent UL LBT failures. Both a timer and a counter may be introduced in the mechanism for triggering of a consistent UL LBT failure event.

In some embodiments, the mechanism may be implemented in the NR MAC specification (i.e., 3GPP TS 38.321 V 15.7.0) similarly as for Beam Failure Detection and Recovery procedure:

The MAC entity may be configured by RRC with a consistent LBT failure recovery procedure. Consistent LBT failure is detected by counting LBT failure indications, for all UL transmissions, from the lower layers to the MAC entity.

In some embodiments, RRC configures the following parameters in the lbt-FailureRecoveryConfig: (i) lbt-FailureInstanceMaxCount for the consistent LBT failure detection; and (ii) lbt-FailureDetectionTimer for the consistent LBT failure detection.

In some embodiments, the following UE variables are used for the consistent LBT failure detection procedure: LBT_COUNTER: counter for LBT failure indication which is initially set to 0.

In some embodiments, the MAC entity shall:
1> if LBT failure indication has been received from lower layers:
  2> start or restart the lbt-FailureDetectionTimer;
  2> increment LBT_COUNTER by 1;
  2> if LBT_COUNTER>=lbt-FailureInstanceMaxCount:
    3> initiate [a recovery mechanism]
1> if the lbt-FailureDetectionTimer expires; or
[1> if lbt-FailureDetectionTimer or lbt-FailureInstanceMaxCount is reconfigured by upper layers:]
  2> set LBT_COUNTER to 0.
[1> if the recovery mechanism is successful:
  2> set LBT_COUNTER to 0;
  2> consider the LBT Failure Recovery procedure successfully completed.]

In some embodiments, the UE shall trigger a radio link failure (RLF) event if the consistent UL LBT failure has been detected in all configured BWPs in the primary cell. That is, the UE shall perform RLF recovery if the consistent UL LBT failure was detected on the PCell and UL LBT failure was detected on "N" possible BWPs.

Consider now conditional handover in NR. In the 3GPP NR Rel-16, as described in the 3GPP RAN2 contribution R2-1900404, conditional handover aims to avoid RLFs due to a late measurement report that may not reach the network or, even when measurement reports are received, and the network decides to perform a handover, the handover command does not reach the UE before RLF happens and UE starts the re-establishment procedure.

In conditional handover, the network configures the UE with triggering conditions for when a handover should be executed. When the conditions are fulfilled, the UE executes the handover (HO) without any further order from the network. The advantage of the procedure is that the HO Command may be provided to the UE at an earlier stage before the radio conditions have become poor, which increases the chance of a successful transmission of the message. The basic signalling flow for conditional handover is shown in FIG. 12 according to some embodiments.

Figure 12:
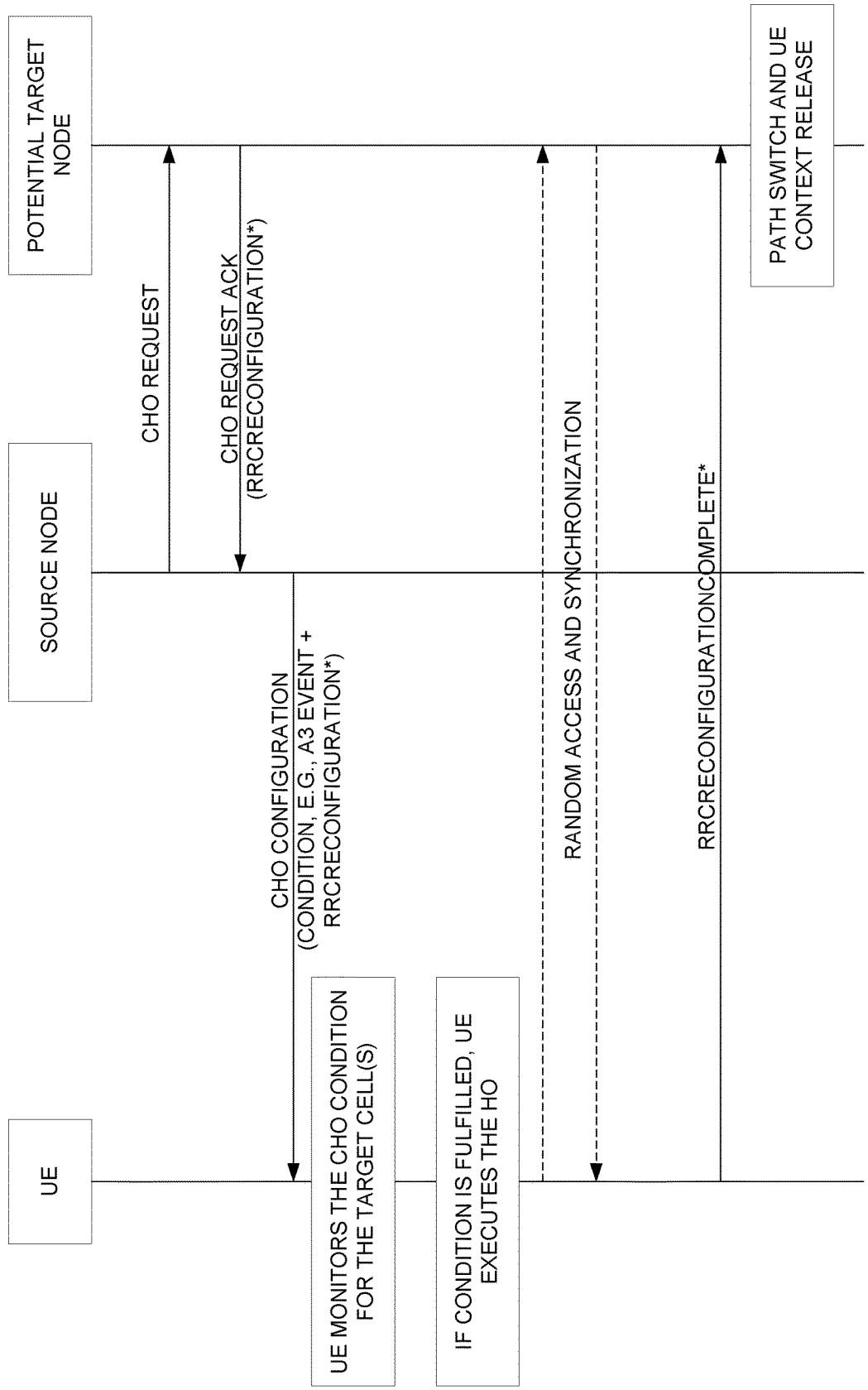
FIG. 12 is a call flow diagram of conditional handover according to some embodiments.

As shown in FIG. 12, a source node transmits a conditional handover (CHO) request to a potential target node. The potential target node responds with a CHO request acknowledgement, including an RRCReconfiguration. After receiving the CHO request acknowledgement, the source node transmits a CHO configuration to the UE, including a triggering condition for the CHO (e.g., an A3 event) as well as the RRCReconfiguration received from the potential target node. After receiving the CHO configuration, the UE monitors the triggering condition for the target cell(s). If a condition is fulfilled, the UE executes the CHO. As shown, for example, the UE performs random access and synchronization with the potential target node, after which the UE transmits an RRCReconfigurationComplete message to the target node. The target node thereafter performs a path switch and UE context release.

Some embodiments address certain challenge(s) in this context. The consistent UL LBT failure handling mechanism will operate per BWP at the MAC layer. With the mechanism, the UE keeps monitoring UL LBT failures for any UL transmission. In the 3GPP NR Rel-16, it is expected that the UE MAC will not distinguish the LBT failure handling between different types of UL transmissions such as Physical Random Access Channel (PRACH) signaling, Physical Uplink Control Channel (PUCCH) signaling, Physical Uplink Shared Channel (PUSCH) transmission and Sounding Reference Signal (SRS) signaling. In this case, the LBT failures occurring for PRACH transmission during a handover or serving cell change would be counted together with the ones due to any other type of UL transmissions. If the consistent UL LBT failures reach the configured counter, an RLF event would heretofore be triggered unconditionally for the UE. Meanwhile, an existing timer T304 during a handover procedure may also expire due to occurrence of consistent UL LBT failures for PRACH transmission, which would heretofore also trigger an RLF event. Therefore, there would exist two different mechanisms running in parallel, both of which would heretofore trigger an RLF event. A first challenge is that it is redundant to keep both mechanisms running. A second challenge is that a first triggered RLF event and the corresponding RRC connection re-establishment procedure may be interrupted by a later triggered second RLF event.

Certain aspects of the present disclosure and their embodiments may provide solutions to these or other challenges. For a UE that is configured with consistent UL LBT failure handling, while a handover is triggered, the UE is configured to suspend the consistent UL LBT failure handling mechanism. With this mechanism suspended, the UE relies on the timer T304 expiry (if the handover is triggered by a CHO candidate, the timer will be T304 like for CHO procedure) to trigger an RLF if the UE has experienced consistent UL LBT failures for the RACH procedure during the handover.

Certain embodiments may provide one or more of the following technical advantage(s). Some embodiments avoid a handover procedure being interrupted by a mechanism defined for handling consistent UL LBT failures. Alternatively or additionally, some embodiments avoid redundant or overlapped RLF events to be triggered.

Some embodiments are particularly applicable to unlicensed operations. These include for instance Licensed-Assisted Access (LAA), enhanced LAA (eLAA), further enhanced LAA (feLAA), MuLteFire, etc.

As a first embodiment, in case a UE triggers a consistent UL LBT failure event (e.g., in its active BWP in its current serving cell) while there is a handover or cell change procedure ongoing (meaning that the UE is performing a random access to a different cell), the UE is configured to not proceed with the consistent UL LBT failure event. In this case, the ongoing random access for the handover is not interrupted. The UE may reset the relevant counters and timers for the UL LBT failure handling.

During handover procedure or cell change, when the UE receives a handover command (i.e., RRC reconfiguration with RRCReconfigurationWithSync in the NR spec) from the source cell, there are two options for the UE to handle the timer T304.

Option 1: same as in NR Rel-15, the timer is started when the UE receives the handover command. The timer is stopped when the UE has completed the handover or the random access channel (RACH) procedure.

Option 2: the timer T304 is not started when the UE receives a handover command. The timer T304 is started when the UE has succeeded LBT operation for the RACH Msg1. The timer is stopped when the UE has completed the handover or the RACH procedure. The timer therefore supervises successful completion of the handover or RACH procedure starting from Msg1 onward.

As a second embodiment, during the handover or cell change procedure, the timer T304 is expired so that the UE cannot complete the procedure. The UE triggers an RLF event accordingly. During the subsequent RRC reestablishment procedure, in the RRCConnectionReestablishmentRequest message, the UE may be configured to set the reestablishmentCause as a specific value indicating occurrence of consistent LBT failures instead of the failure cause "handoverFailure" if at least one of the below conditions is fulfilled:
1) While the handover procedure is running, the UE has already triggered a failure event for consistent UL LBT failures; however, that failure event has been skipped.
2) During the handover procedure, the expiration of the timer T304 is due to occurrence of consistent UL LBT failures for transmissions of the RACH uplink messages (i.e., Msg1 or Msg3 in a 4-step RA procedure, and MsgA in a 2-step RA procedure).

As a third embodiment, for the UE, whether or not to skip processing of the triggered consistent UL LBT failures while a handover procedure is on-going is up to radio network node (e.g., gNB) configuration. The configuration may be signaled to the UE via system information, a dedicated RRC signaling, a MAC Control Element (CE) or Downlink Control Information (DCI) signaling. In an example, the configuration may be signaled via a handover command (i.e., RRC reconfiguration with RRCReconfigurationWithSync in the NR specification).

As a fourth embodiment, the handover command may carry one or more indicators to the UE indicating that the UE can suspend the existing configured LBT failure handling mechanism in the serving cell while the handover procedure is running. The LBT failure handling mechanism can be resumed when the current handover procedure is completed or failed. In another example, the LBT failure handling mechanism can be resumed when the UE has completed RRC connection reestablishment. In that case, the LBT failure handling mechanism may be resumed in the new serving cell. The indicator(s) may be signaled explicitly or inexplicitly. For the former option, the handover command signaling carries an explicit indicator. For the latter option, the handover command signaling may carry a new configuration Information Element (IE) for consistent UL LBT failure handling, in which the necessary parameters such as the counter and the timer may be set as infinite values. In another option, the necessary parameters such as the counter and the timer may be absent. In this way, it is indicated that the mechanism is suspended during the handover procedure. After the handover or the RRC connection reestablishment, the gNB can signal an updated configuration IE for consistent UL LBT failure handling, in which the necessary parameters such the counter and the timer are present with a suitable setting indicating the mechanism is resumed.

Figure 13:
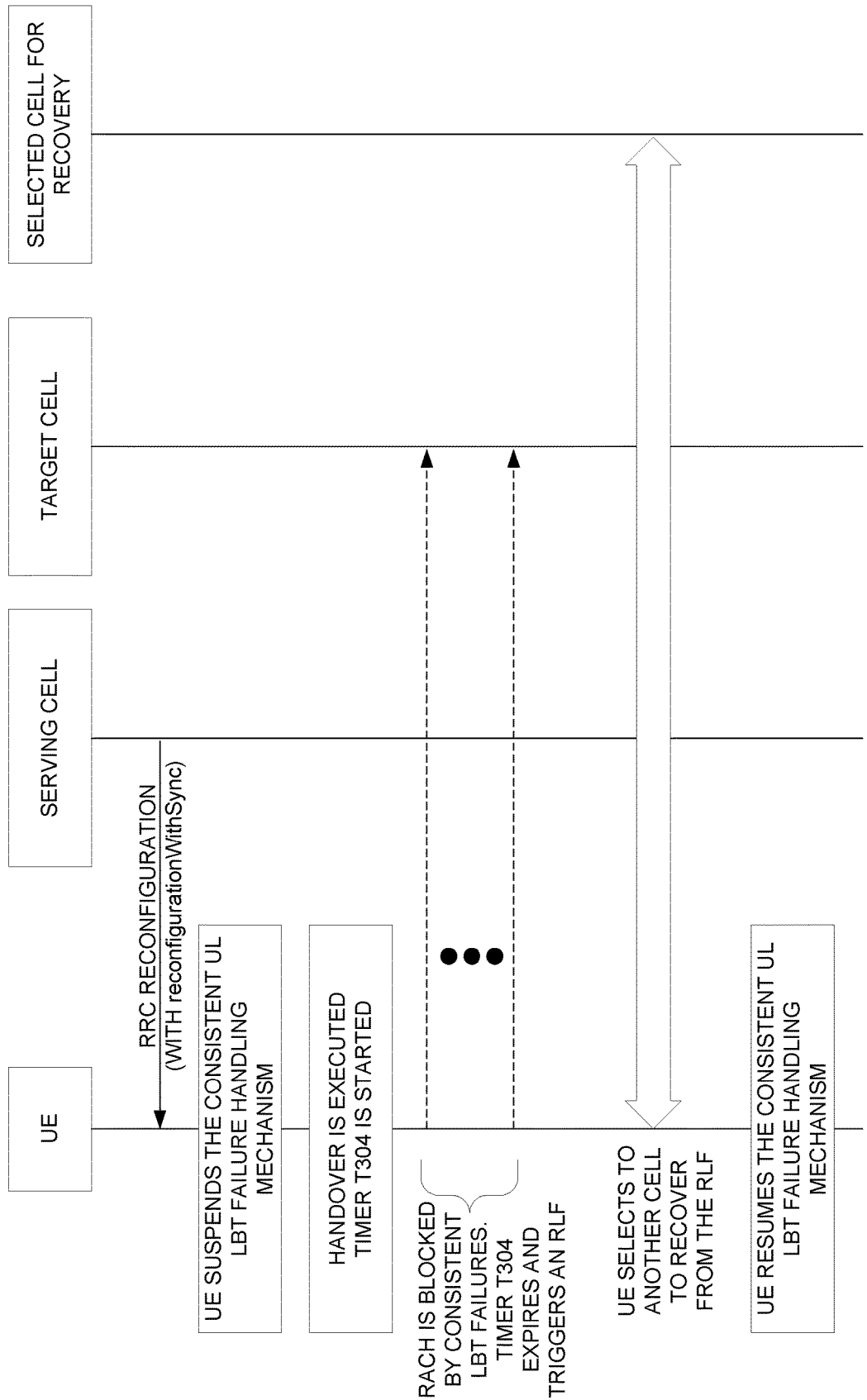
FIG. 13 is a call flow diagram of consistent uplink LBT failure handling while performing a handover according to some embodiments.

An example of the suspension and resume procedure for the consistent UL LBT failures handling during a handover procedure is illustrated in FIG. 13. As shown, during a handover procedure, the consistent UL LBT failures handling is suspended. So the UE relies on the timer T304 expiry to trigger an RLF event when consistent UL LBT failures are occurred.

More particularly, the serving cell in FIG. 13 first transmits to the UE an RRCReconfiguration with reconfigurationWthSync. This initiates a handover procedure to a target cell. With the handover procedure initiated, the UE suspends the consistent UL LBT failure handling mechanism, executes handover towards the target cell, and starts timer T304. During the handover procedure, the UE's RACH attempts are blocked by consistent LBT failures. But with the consistent UL LBT failure handling mechanism suspended, no RLF is declared or considered to occur as a result of these consistent LBT failures. Instead, timer T304 expires because the UE is unable to complete the handover within the timer's duration. Rather than consistent LBT failures causing RLF, then, it is expiry of the timer T304 that triggers an RLF in this example. Accordingly, the UE selects another cell to recover from the RLF and thereafter resumes the consistent UL LBT failure handling mechanism.

As a fifth embodiment, for and in combination with any of the above embodiments, the handover may be triggered by a conditional handover (CHO) candidate which has been configured to the UE, and the configured CHO execution condition has been fulfilled. If the handover is triggered by a CHO candidate, as described in previous embodiments, the indicator(s) indicating to the UE to skip processing of the triggered consistent UL LBT failures or to suspend the existing configured LBT failure handling mechanism while the handover is running can be included in the CHO configuration(s). For a CHO, the timer whose expiry will trigger an RLF event may not be named as the timer T304; the eventual name of the timer is not fully settled down in the 3GPP Rel-16 yet. It will be a T304-like timer.

As a sixth embodiment, upon detection of an RLF event during a handover procedure due to occurrence of consistent UL LBT failures, the UE performs cell selection to perform recovery from the failure. If the selected cell is a CHO candidate, then the UE attempts CHO execution. Otherwise, RRC re-establishment is performed. The UE may also select the cell with the lowest measured channel occupancy or lowest LBT failure ratio.

Some embodiments herein may be implemented using the logic below, e.g., in the context of a New Radio (NR) system. Notice here that the UE considers RLF to be detected upon consistent uplink LBT failure while T304 is not running. The SpCell is the primary cell of a master or secondary cell group.

The UE shall:
1> upon receiving N310 consecutive "out-of-sync" indications for the SpCell from lower layers while neither T300, T301, T304, T311 nor T319 are running:
2> start timer T310 for the corresponding SpCell. Upon receiving N311 consecutive "in-sync" indications for the SpCell from lower layers while T310 is running, the UE shall:
1> stop timer T310 for the corresponding SpCell.
NOTE 1: In this case, the UE maintains the RRC connection without explicit signalling, i.e. the UE maintains the entire radio resource configuration.
NOTE 2: Periods in time where neither "in-sync" nor "out-of-sync" is reported by L1 do not affect the evaluation of the number of consecutive "in-sync" or "out-of-sync" indications.

The UE shall:
- 1> upon T310 expiry in PCell; or
- 1> upon random access problem indication from MCG MAC while neither T300, T301, T304, T311 nor T319 are running; or
- 1> upon consistent uplink LBT failure while T304 is not running; or
- 1> upon indication from MCG Radio Link Control (RLC) that the maximum number of retransmissions has been reached:
    - 2> if the indication is from MCG RLC and carrier aggregation (CA) duplication is configured and activated, and for the corresponding logical channel allowedServingCells only includes SCell(s):
        - 3> initiate the failure information procedure to report RLC failure.
    - 2> else:
        - 3> consider radio link failure to be detected for the MCG i.e. RLF;
        - 3> if access stratum (AS) security has not been activated:
            - 4> perform the actions upon going to RRC_IDLE, with release cause 'other';
        - 3> else if AS security has been activated but signaling radio bearer #2 (SRB2) and at least one data radio bearer (DRB) have not been setup:
            - 4> perform the actions upon going to RRC_IDLE, with release cause 'RRC connection failure';
        - 3> else:
            - 4> initiate the connection re-establishment procedure.

The UE shall:
- 1> upon T310 expiry in PSCell; or
- 1> upon random access problem indication from SCG MAC; or
- 1> upon indication from SCG RLC that the maximum number of retransmissions has been reached:
    - 2> if the indication is from SCG RLC and CA duplication is configured and activated; and for the corresponding logical channel allowedServingCells only includes SCell(s):
        - 3> initiate the failure information procedure to report RLC failure.
    - 2> else:
        - 3> consider radio link failure to be detected for the SCG, i.e. SCG RLF;
        - 3> initiate the SCG failure information procedure to report SCG radio link failure.

Figure 14:
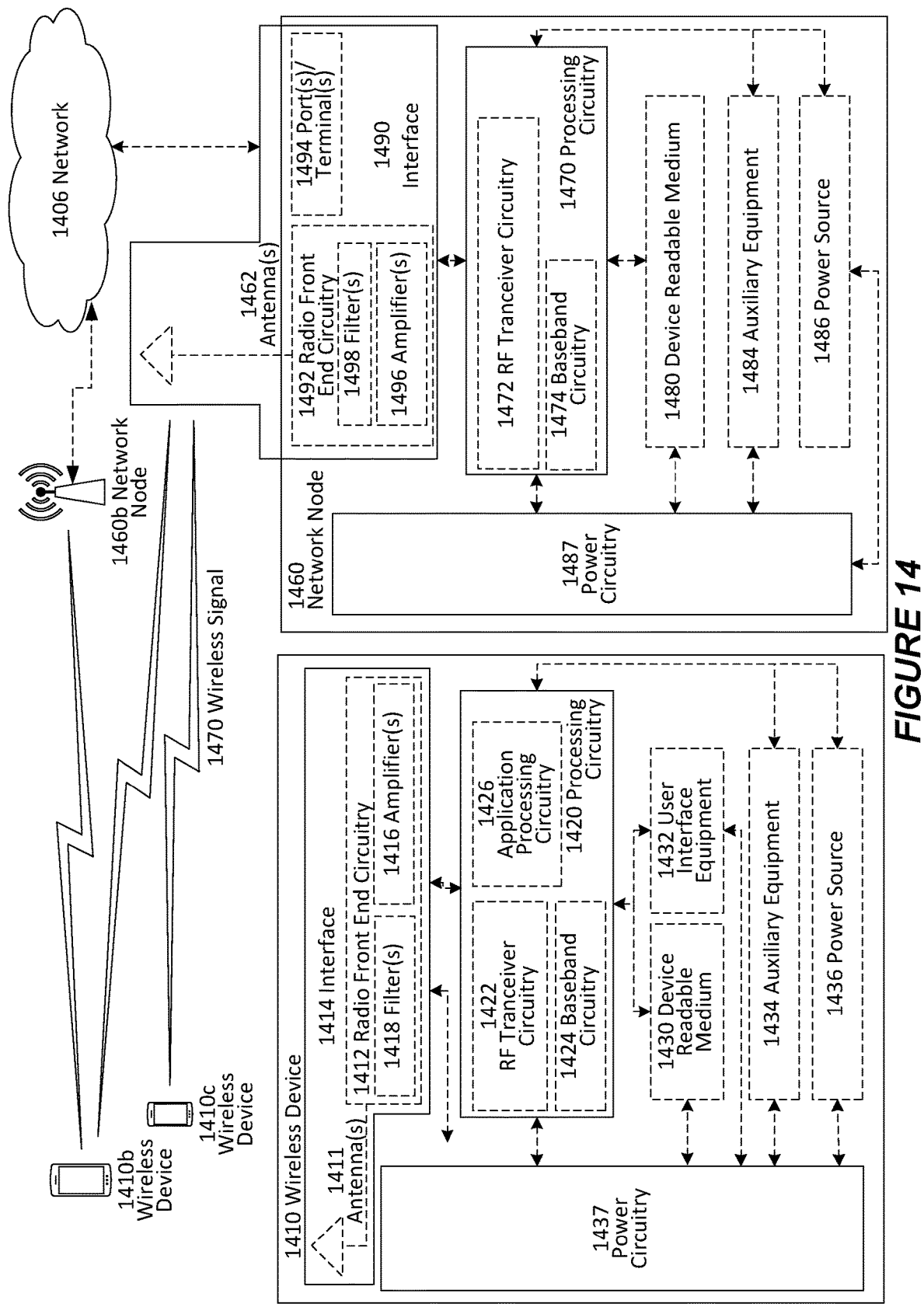
FIG. 14 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 14. For simplicity, the wireless network of FIG. 14 only depicts network 1406, network nodes 1460 and 1460b, and WDs 1410, 1410b, and 1410c. In practice, a wireless network may further include any additional elements suitable to support communication between wireless devices or between a wireless device and another communication device, such as a landline telephone, a service provider, or any other network node or end device. Of the illustrated components, network node 1460 and wireless device (WD) 1410 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1406 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1460 and WD 1410 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 14, network node 1460 includes processing circuitry 1470, device readable medium 1480, interface 1490, auxiliary equipment 1484, power source 1486, power circuitry 1487, and antenna 1462. Although network node 1460 illustrated in the example wireless network of FIG. 14 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1460 are depicted as single boxes located within a larger box, or nested within multiple boxes, in practice, a network node may comprise multiple different physical components that make up a single illustrated component (e.g., device readable medium 1480 may comprise multiple separate hard drives as well as multiple RAM modules).

Similarly, network node 1460 may be composed of multiple physically separate components (e.g., a NodeB component and a RNC component, or a BTS component and a BSC component, etc.), which may each have their own respective components. In certain scenarios in which network node 1460 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1460 may be configured to support multiple radio access technologies (RATs). In such embodiments, some components may be duplicated (e.g., separate device readable medium 1480 for the different RATs) and some components may be reused (e.g., the same antenna 1462 may be shared by the RATs). Network node 1460 may also include multiple sets of the various illustrated components for different wireless technologies integrated into network node 1460, such as, for example, GSM, WCDMA, LTE, NR, WiFi, or Bluetooth wireless technologies. These wireless technologies may be integrated into the same or different chip or set of chips and other components within network node 1460.

Processing circuitry 1470 is configured to perform any determining, calculating, or similar operations (e.g., certain obtaining operations) described herein as being provided by a network node. These operations performed by processing circuitry 1470 may include processing information obtained by processing circuitry 1470 by, for example, converting the obtained information into other information, comparing the obtained information or converted information to information stored in the network node, and/or performing one or more operations based on the obtained information or converted information, and as a result of said processing making a determination.

Processing circuitry 1470 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1460 components, such as device readable medium 1480, network node 1460 functionality. For example, processing circuitry 1470 may execute instructions stored in device readable medium 1480 or in memory within processing circuitry 1470. Such functionality may include providing any of the various wireless features, functions, or benefits discussed herein. In some embodiments, processing circuitry 1470 may include a system on a chip (SOC).

In some embodiments, processing circuitry 1470 may include one or more of radio frequency (RF) transceiver circuitry 1472 and baseband processing circuitry 1474. In some embodiments, radio frequency (RF) transceiver circuitry 1472 and baseband processing circuitry 1474 may be on separate chips (or sets of chips), boards, or units, such as radio units and digital units. In alternative embodiments, part or all of RF transceiver circuitry 1472 and baseband processing circuitry 1474 may be on the same chip or set of chips, boards, or units In certain embodiments, some or all of the functionality described herein as being provided by a network node, base station, eNB or other such network device may be performed by processing circuitry 1470 executing instructions stored on device readable medium 1480 or memory within processing circuitry 1470. In alternative embodiments, some or all of the functionality may be provided by processing circuitry 1470 without executing instructions stored on a separate or discrete device readable medium, such as in a hard-wired manner. In any of those embodiments, whether executing instructions stored on a device readable storage medium or not, processing circuitry 1470 can be configured to perform the described functionality. The benefits provided by such functionality are not limited to processing circuitry 1470 alone or to other components of network node 1460, but are enjoyed by network node 1460 as a whole, and/or by end users and the wireless network generally.

Device readable medium 1480 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1470. Device readable medium 1480 may store any suitable instructions, data or information, including a computer program, software, an application including one or more of logic, rules, code, tables, etc. and/or other instructions capable of being executed by processing circuitry 1470 and, utilized by network node 1460. Device readable medium 1480 may be used to store any calculations made by processing circuitry 1470 and/or any data received via interface 1490. In some embodiments, processing circuitry 1470 and device readable medium 1480 may be considered to be integrated.

Interface 1490 is used in the wired or wireless communication of signalling and/or data between network node 1460, network 1406, and/or WDs 1410. As illustrated, interface 1490 comprises port(s)/terminal(s) 1494 to send and receive data, for example to and from network 1406 over a wired connection. Interface 1490 also includes radio front end circuitry 1492 that may be coupled to, or in certain embodiments a part of, antenna 1462. Radio front end circuitry 1492 comprises filters 1498 and amplifiers 1496.

Radio front end circuitry 1492 may be connected to antenna 1462 and processing circuitry 1470. Radio front end circuitry may be configured to condition signals communicated between antenna 1462 and processing circuitry 1470. Radio front end circuitry 1492 may receive digital data that is to be sent out to other network nodes or WDs via a wireless connection. Radio front end circuitry 1492 may convert the digital data into a radio signal having the appropriate channel and bandwidth parameters using a combination of filters 1498 and/or amplifiers 1496. The radio signal may then be transmitted via antenna 1462. Similarly, when receiving data, antenna 1462 may collect radio signals which are then converted into digital data by radio front end circuitry 1492. The digital data may be passed to processing circuitry 1470. In other embodiments, the interface may comprise different components and/or different combinations of components.

In certain alternative embodiments, network node 1460 may not include separate radio front end circuitry 1492, instead, processing circuitry 1470 may comprise radio front end circuitry and may be connected to antenna 1462 without separate radio front end circuitry 1492. Similarly, in some embodiments, all or some of RF transceiver circuitry 1472 may be considered a part of interface 1490. In still other embodiments, interface 1490 may include one or more ports or terminals 1494, radio front end circuitry 1492, and RF transceiver circuitry 1472, as part of a radio unit (not shown), and interface 1490 may communicate with baseband processing circuitry 1474, which is part of a digital unit (not shown).

Antenna 1462 may include one or more antennas, or antenna arrays, configured to send and/or receive wireless signals. Antenna 1462 may be coupled to radio front end circuitry 1490 and may be any type of antenna capable of transmitting and receiving data and/or signals wirelessly. In some embodiments, antenna 1462 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1462 may be separate from network node 1460 and may be connectable to network node 1460 through an interface or port.

Antenna 1462, interface 1490, and/or processing circuitry 1470 may be configured to perform any receiving operations and/or certain obtaining operations described herein as being performed by a network node. Any information, data and/or signals may be received from a wireless device, another network node and/or any other network equipment. Similarly, antenna 1462, interface 1490, and/or processing circuitry 1470 may be configured to perform any transmitting operations described herein as being performed by a network node. Any information, data and/or signals may be transmitted to a wireless device, another network node and/or any other network equipment.

Power circuitry 1487 may comprise, or be coupled to, power management circuitry and is configured to supply the components of network node 1460 with power for performing the functionality described herein. Power circuitry 1487 may receive power from power source 1486. Power source 1486 and/or power circuitry 1487 may be configured to provide power to the various components of network node 1460 in a form suitable for the respective components (e.g., at a voltage and current level needed for each respective component). Power source 1486 may either be included in, or external to, power circuitry 1487 and/or network node 1460. For example, network node 1460 may be connectable to an external power source (e.g., an electricity outlet) via an input circuitry or interface such as an electrical cable, whereby the external power source supplies power to power circuitry 1487. As a further example, power source 1486 may comprise a source of power in the form of a battery or battery pack which is connected to, or integrated in, power circuitry 1487. The battery may provide backup power should the external power source fail. Other types of power sources, such as photovoltaic devices, may also be used.

Alternative embodiments of network node 1460 may include additional components beyond those shown in FIG. 14 that may be responsible for providing certain aspects of the network node's functionality, including any of the functionality described herein and/or any functionality necessary to support the subject matter described herein. For example, network node 1460 may include user interface equipment to allow input of information into network node 1460 and to allow output of information from network node 1460. This may allow a user to perform diagnostic, maintenance, repair, and other administrative functions for network node 1460.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1410 includes antenna 1411, interface 1414, processing circuitry 1420, device readable medium 1430, user interface equipment 1432, auxiliary equipment 1434, power source 1436 and power circuitry 1437. WD 1410 may include multiple sets of one or more of the illustrated components for different wireless technologies supported by WD 1410, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1410.

Antenna 1411 may include one or more antennas or antenna arrays, configured to send and/or receive wireless signals, and is connected to interface 1414. In certain alternative embodiments, antenna 1411 may be separate from WD 1410 and be connectable to WD 1410 through an interface or port. Antenna 1411, interface 1414, and/or processing circuitry 1420 may be configured to perform any receiving or transmitting operations described herein as being performed by a WD. Any information, data and/or signals may be received from a network node and/or another WD. In some embodiments, radio front end circuitry and/or antenna 1411 may be considered an interface.

As illustrated, interface 1414 comprises radio front end circuitry 1412 and antenna 1411. Radio front end circuitry 1412 comprise one or more filters 1418 and amplifiers 1416. Radio front end circuitry 1414 is connected to antenna 1411 and processing circuitry 1420, and is configured to condition signals communicated between antenna 1411 and processing circuitry 1420. Radio front end circuitry 1412 may be coupled to or a part of antenna 1411. In some embodiments, WD 1410 may not include separate radio front end circuitry 1412; rather, processing circuitry 1420 may comprise radio front end circuitry and may be connected to antenna 1411. Similarly, in some embodiments, some or all of RF transceiver circuitry 1422 may be considered a part of interface 1414. Radio front end circuitry 1412 may receive digital data that is to be sent out to other network nodes or WDs via a wireless connection. Radio front end circuitry 1412 may convert the digital data into a radio signal having the appropriate channel and bandwidth parameters using a combination of filters 1418 and/or amplifiers 1416. The radio signal may then be transmitted via antenna 1411. Similarly, when receiving data, antenna 1411 may collect radio signals which are then converted into digital data by radio front end circuitry 1412. The digital data may be passed to processing circuitry 1420. In other embodiments, the interface may comprise different components and/or different combinations of components.

Processing circuitry 1420 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1410 components, such as device readable medium 1430, WD 1410 functionality. Such functionality may include providing any of the various wireless features or benefits discussed herein. For example, processing circuitry 1420 may execute instructions stored in device readable medium 1430 or in memory within processing circuitry 1420 to provide the functionality disclosed herein.

As illustrated, processing circuitry 1420 includes one or more of RF transceiver circuitry 1422, baseband processing circuitry 1424, and application processing circuitry 1426. In other embodiments, the processing circuitry may comprise different components and/or different combinations of components. In certain embodiments processing circuitry 1420 of WD 1410 may comprise a SOC. In some embodiments, RF transceiver circuitry 1422, baseband processing circuitry 1424, and application processing circuitry 1426 may be on separate chips or sets of chips. In alternative embodiments, part or all of baseband processing circuitry 1424 and application processing circuitry 1426 may be combined into one chip or set of chips, and RF transceiver circuitry 1422 may be on a separate chip or set of chips. In still alternative embodiments, part or all of RF transceiver circuitry 1422 and baseband processing circuitry 1424 may be on the same chip or set of chips, and application processing circuitry 1426 may be on a separate chip or set of chips. In yet other alternative embodiments, part or all of RF transceiver circuitry 1422, baseband processing circuitry 1424, and application processing circuitry 1426 may be combined in the same chip or set of chips. In some embodiments, RF transceiver circuitry 1422 may be a part of interface 1414. RF transceiver circuitry 1422 may condition RF signals for processing circuitry 1420.

In certain embodiments, some or all of the functionality described herein as being performed by a WD may be provided by processing circuitry 1420 executing instructions stored on device readable medium 1430, which in certain embodiments may be a computer-readable storage medium. In alternative embodiments, some or all of the functionality may be provided by processing circuitry 1420 without executing instructions stored on a separate or discrete device readable storage medium, such as in a hard-wired manner. In any of those particular embodiments, whether executing instructions stored on a device readable storage medium or not, processing circuitry 1420 can be configured to perform the described functionality. The benefits provided by such functionality are not limited to processing circuitry 1420 alone or to other components of WD 1410, but are enjoyed by WD 1410 as a whole, and/or by end users and the wireless network generally.

Processing circuitry 1420 may be configured to perform any determining, calculating, or similar operations (e.g., certain obtaining operations) described herein as being performed by a WD. These operations, as performed by processing circuitry 1420, may include processing information obtained by processing circuitry 1420 by, for example, converting the obtained information into other information, comparing the obtained information or converted information to information stored by WD 1410, and/or performing one or more operations based on the obtained information or converted information, and as a result of said processing making a determination.

Device readable medium 1430 may be operable to store a computer program, software, an application including one or more of logic, rules, code, tables, etc. and/or other instructions capable of being executed by processing circuitry 1420. Device readable medium 1430 may include computer memory (e.g., Random Access Memory (RAM) or Read Only Memory (ROM)), mass storage media (e.g., a hard disk), removable storage media (e.g., a Compact Disk (CD)

or a Digital Video Disk (DVD)), and/or any other volatile or non-volatile, non-transitory device readable and/or computer executable memory devices that store information, data, and/or instructions that may be used by processing circuitry 1420. In some embodiments, processing circuitry 1420 and device readable medium 1430 may be considered to be integrated.

User interface equipment 1432 may provide components that allow for a human user to interact with WD 1410. Such interaction may be of many forms, such as visual, audial, tactile, etc. User interface equipment 1432 may be operable to produce output to the user and to allow the user to provide input to WD 1410. The type of interaction may vary depending on the type of user interface equipment 1432 installed in WD 1410. For example, if WD 1410 is a smart phone, the interaction may be via a touch screen; if WD 1410 is a smart meter, the interaction may be through a screen that provides usage (e.g., the number of gallons used) or a speaker that provides an audible alert (e.g., if smoke is detected). User interface equipment 1432 may include input interfaces, devices and circuits, and output interfaces, devices and circuits. User interface equipment 1432 is configured to allow input of information into WD 1410, and is connected to processing circuitry 1420 to allow processing circuitry 1420 to process the input information. User interface equipment 1432 may include, for example, a microphone, a proximity or other sensor, keys/buttons, a touch display, one or more cameras, a USB port, or other input circuitry. User interface equipment 1432 is also configured to allow output of information from WD 1410, and to allow processing circuitry 1420 to output information from WD 1410. User interface equipment 1432 may include, for example, a speaker, a display, vibrating circuitry, a USB port, a headphone interface, or other output circuitry. Using one or more input and output interfaces, devices, and circuits, of user interface equipment 1432, WD 1410 may communicate with end users and/or the wireless network, and allow them to benefit from the functionality described herein.

Auxiliary equipment 1434 is operable to provide more specific functionality which may not be generally performed by WDs. This may comprise specialized sensors for doing measurements for various purposes, interfaces for additional types of communication such as wired communications etc. The inclusion and type of components of auxiliary equipment 1434 may vary depending on the embodiment and/or scenario.

Power source 1436 may, in some embodiments, be in the form of a battery or battery pack. Other types of power sources, such as an external power source (e.g., an electricity outlet), photovoltaic devices or power cells, may also be used. WD 1410 may further comprise power circuitry 1437 for delivering power from power source 1436 to the various parts of WD 1410 which need power from power source 1436 to carry out any functionality described or indicated herein. Power circuitry 1437 may in certain embodiments comprise power management circuitry. Power circuitry 1437 may additionally or alternatively be operable to receive power from an external power source; in which case WD 1410 may be connectable to the external power source (such as an electricity outlet) via input circuitry or an interface such as an electrical power cable. Power circuitry 1437 may also in certain embodiments be operable to deliver power from an external power source to power source 1436. This may be, for example, for the charging of power source 1436. Power circuitry 1437 may perform any formatting, converting, or other modification to the power from power source 1436 to make the power suitable for the respective components of WD 1410 to which power is supplied.

Figure 15:
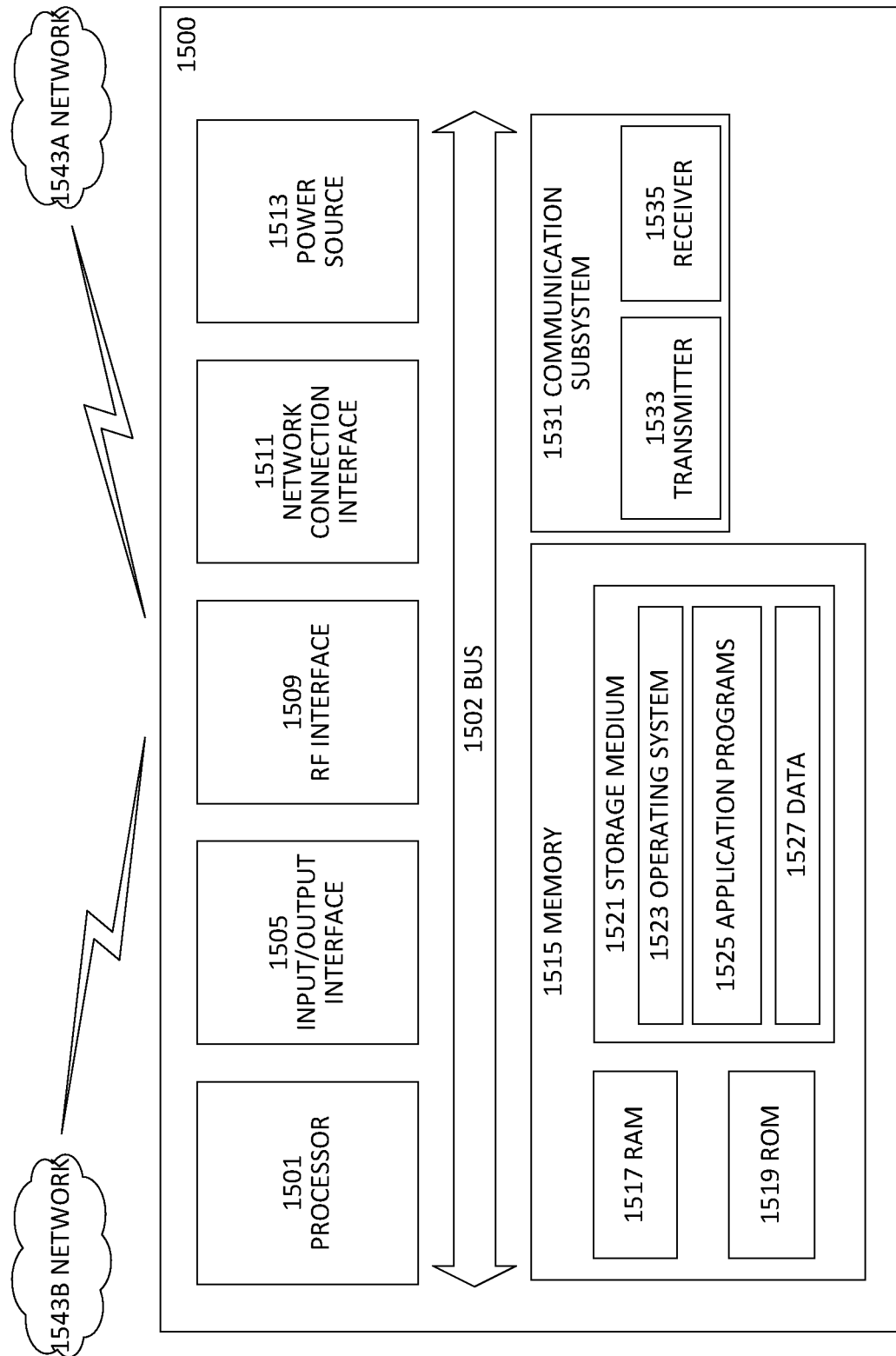
FIG. 15 is a block diagram of a user equipment according to some embodiments.

FIG. 15 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 15200 may be any UE identified by the $3^{rd}$ Generation Partnership Project (3GPP), including a NB-IoT UE, a machine type communication (MTC) UE, and/or an enhanced MTC (eMTC) UE. UE 1500, as illustrated in FIG. 15, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 15 is a UE, the components discussed herein are equally applicable to a WD, and vice-versa.

In FIG. 15, UE 1500 includes processing circuitry 1501 that is operatively coupled to input/output interface 1505, radio frequency (RF) interface 1509, network connection interface 1511, memory 1515 including random access memory (RAM) 1517, read-only memory (ROM) 1519, and storage medium 1521 or the like, communication subsystem 1531, power source 1533, and/or any other component, or any combination thereof. Storage medium 1521 includes operating system 1523, application program 1525, and data 1527. In other embodiments, storage medium 1521 may include other similar types of information. Certain UEs may utilize all of the components shown in FIG. 15, or only a subset of the components. The level of integration between the components may vary from one UE to another UE. Further, certain UEs may contain multiple instances of a component, such as multiple processors, memories, transceivers, transmitters, receivers, etc.

In FIG. 15, processing circuitry 1501 may be configured to process computer instructions and data. Processing circuitry 1501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1501 may include two central processing units (CPUs). Data may be information in a form suitable for use by a computer.

In the depicted embodiment, input/output interface 1505 may be configured to provide a communication interface to an input device, output device, or input and output device. UE 1500 may be configured to use an output device via input/output interface 1505. An output device may use the same type of interface port as an input device. For example, a USB port may be used to provide input to and output from UE 1500. The output device may be a speaker, a sound card, a video card, a display, a monitor, a printer, an actuator, an emitter, a smartcard, another output device, or any combination thereof. UE 1500 may be configured to use an input device via input/output interface 1505 to allow a user to capture information into UE 1500. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 15, RF interface 1509 may be configured to provide a communication interface to RF components such as a transmitter, a receiver, and an antenna. Network connection interface 1511 may be configured to provide a communication interface to network 1543a. Network 1543a may encompass wired and/or wireless networks such as a local-area network (LAN), a wide-area network (WAN), a computer network, a wireless network, a telecommunications network, another like network or any combination thereof. For example, network 1543a may comprise a Wi-Fi network. Network connection interface 1511 may be configured to include a receiver and a transmitter interface used to communicate with one or more other devices over a communication network according to one or more communication protocols, such as Ethernet, TCP/IP, SONET, ATM, or the like. Network connection interface 1511 may implement receiver and transmitter functionality appropriate to the communication network links (e.g., optical, electrical, and the like). The transmitter and receiver functions may share circuit components, software or firmware, or alternatively may be implemented separately.

RAM 1517 may be configured to interface via bus 1502 to processing circuitry 1501 to provide storage or caching of data or computer instructions during the execution of software programs such as the operating system, application programs, and device drivers. ROM 1519 may be configured to provide computer instructions or data to processing circuitry 1501. For example, ROM 1519 may be configured to store invariant low-level system code or data for basic system functions such as basic input and output (I/O), startup, or reception of keystrokes from a keyboard that are stored in a non-volatile memory. Storage medium 1521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1521 may be configured to include operating system 1523, application program 1525 such as a web browser application, a widget or gadget engine or another application, and data file 1527. Storage medium 1521 may store, for use by UE 1500, any of a variety of various operating systems or combinations of operating systems.

Storage medium 1521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1521 may allow UE 1500 to access computer-executable instructions, application programs or the like, stored on transitory or non-transitory memory media, to off-load data, or to upload data. An article of manufacture, such as one utilizing a communication system may be tangibly embodied in storage medium 1521, which may comprise a device readable medium.

In FIG. 15, processing circuitry 1501 may be configured to communicate with network 1543b using communication subsystem 1531. Network 1543a and network 1543b may be the same network or networks or different network or networks. Communication subsystem 1531 may be configured to include one or more transceivers used to communicate with network 1543b. For example, communication subsystem 1531 may be configured to include one or more transceivers used to communicate with one or more remote transceivers of another device capable of wireless communication such as another WD, UE, or base station of a radio access network (RAN) according to one or more communication protocols, such as IEEE 802.15, CDMA, WCDMA, GSM, LTE, UTRAN, WiMax, or the like. Each transceiver may include transmitter 1533 and/or receiver 1535 to implement transmitter or receiver functionality, respectively, appropriate to the RAN links (e.g., frequency allocations and the like). Further, transmitter 1533 and receiver 1535 of each transceiver may share circuit components, software or firmware, or alternatively may be implemented separately.

In the illustrated embodiment, the communication functions of communication subsystem 1531 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1531 may include cellular communication, Wi-Fi communication, Bluetooth communication, and GPS communication. Network 1543b may encompass wired and/or wireless networks such as a local-area network (LAN), a wide-area network (WAN), a computer network, a wireless network, a telecommunications network, another like network or any combination thereof. For example, network 1543b may be a cellular network, a Wi-Fi network, and/or a near-field network. Power source 1513 may be configured to provide alternating current (AC) or direct current (DC) power to components of UE 1500.

The features, benefits and/or functions described herein may be implemented in one of the components of UE 1500 or partitioned across multiple components of UE 1500. Further, the features, benefits, and/or functions described herein may be implemented in any combination of hardware, software or firmware. In one example, communication subsystem 1531 may be configured to include any of the components described herein. Further, processing circuitry 1501 may be configured to communicate with any of such components over bus 1502. In another example, any of such components may be represented by program instructions stored in memory that when executed by processing circuitry 1501 perform the corresponding functions described herein. In another example, the functionality of any of such components may be partitioned between processing circuitry 1501 and communication subsystem 1531. In another example, the non-computationally intensive functions of any of such components may be implemented in software or firmware and the computationally intensive functions may be implemented in hardware.

Figure 16:
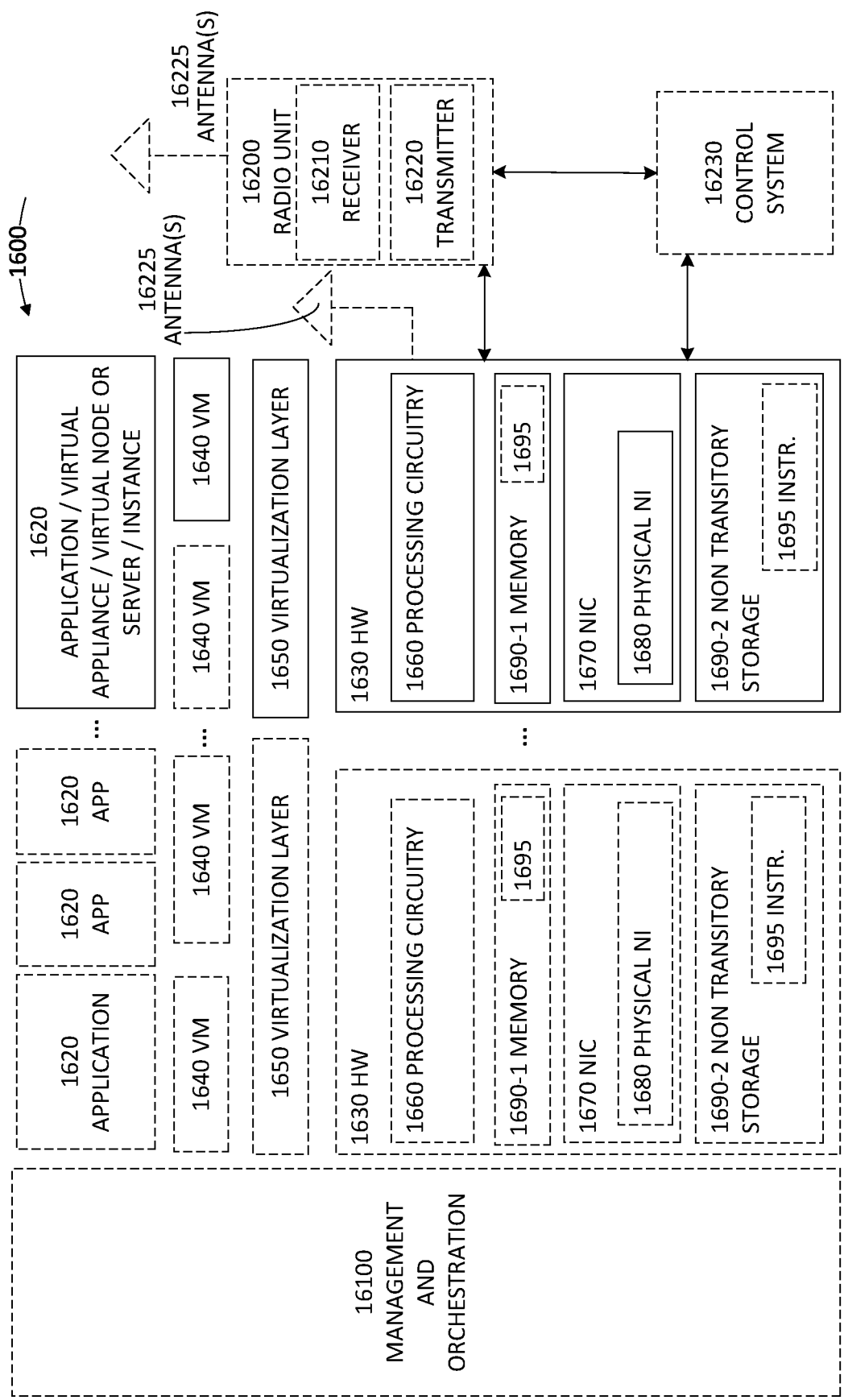
FIG. 16 is a block diagram of a virtualization environment according to some embodiments.

FIG. 16 is a schematic block diagram illustrating a virtualization environment 1600 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1600 hosted by one or more of hardware nodes 1630. Further, in embodiments in which the virtual node is not a radio access node or does not require radio connectivity (e.g., a core network node), then the network node may be entirely virtualized.

The functions may be implemented by one or more applications 1620 (which may alternatively be called software instances, virtual appliances, network functions, virtual nodes, virtual network functions, etc.) operative to implement some of the features, functions, and/or benefits of some of the embodiments disclosed herein. Applications 1620 are run in virtualization environment 1600 which provides hardware 1630 comprising processing circuitry 1660 and memory 1690. Memory 1690 contains instructions 1695 executable by processing circuitry 1660 whereby application 1620 is operative to provide one or more of the features, benefits, and/or functions disclosed herein.

Virtualization environment 1600, comprises general-purpose or special-purpose network hardware devices 1630 comprising a set of one or more processors or processing circuitry 1660, which may be commercial off-the-shelf (COTS) processors, dedicated Application Specific Integrated Circuits (ASICs), or any other type of processing circuitry including digital or analog hardware components or special purpose processors. Each hardware device may comprise memory 1690-1 which may be non-persistent memory for temporarily storing instructions 1695 or software executed by processing circuitry 1660. Each hardware device may comprise one or more network interface controllers (NICs) 1670, also known as network interface cards, which include physical network interface 1680. Each hardware device may also include non-transitory, persistent, machine-readable storage media 1690-2 having stored therein software 1695 and/or instructions executable by processing circuitry 1660. Software 1695 may include any type of software including software for instantiating one or more virtualization layers 1650 (also referred to as hypervisors), software to execute virtual machines 1640 as well as software allowing it to execute functions, features and/or benefits described in relation with some embodiments described herein.

Virtual machines 1640, comprise virtual processing, virtual memory, virtual networking or interface and virtual storage, and may be run by a corresponding virtualization layer 1650 or hypervisor. Different embodiments of the instance of virtual appliance 1620 may be implemented on one or more of virtual machines 1640, and the implementations may be made in different ways.

During operation, processing circuitry 1660 executes software 1695 to instantiate the hypervisor or virtualization layer 1650, which may sometimes be referred to as a virtual machine monitor (VMM). Virtualization layer 1650 may present a virtual operating platform that appears like networking hardware to virtual machine 1640.

As shown in FIG. 16, hardware 1630 may be a standalone network node with generic or specific components. Hardware 1630 may comprise antenna 16225 and may implement some functions via virtualization. Alternatively, hardware 1630 may be part of a larger cluster of hardware (e.g. such as in a data center or customer premise equipment (CPE)) where many hardware nodes work together and are managed via management and orchestration (MANO) 16100, which, among others, oversees lifecycle management of applications 1620.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1640 may be a software implementation of a physical machine that runs programs as if they were executing on a physical, non-virtualized machine. Each of virtual machines 1640, and that part of hardware 1630 that executes that virtual machine, be it hardware dedicated to that virtual machine and/or hardware shared by that virtual machine with others of the virtual machines 1640, forms a separate virtual network elements (VNE).

Still in the context of NFV, Virtual Network Function (VNF) is responsible for handling specific network functions that run in one or more virtual machines 1640 on top of hardware networking infrastructure 1630 and corresponds to application 1620 in FIG. 16.

In some embodiments, one or more radio units 16200 that each include one or more transmitters 16220 and one or more receivers 16210 may be coupled to one or more antennas 16225. Radio units 16200 may communicate directly with hardware nodes 1630 via one or more appropriate network interfaces and may be used in combination with the virtual components to provide a virtual node with radio capabilities, such as a radio access node or a base station.

In some embodiments, some signalling can be effected with the use of control system 16230 which may alternatively be used for communication between the hardware nodes 1630 and radio units 16200.

Figure 17:
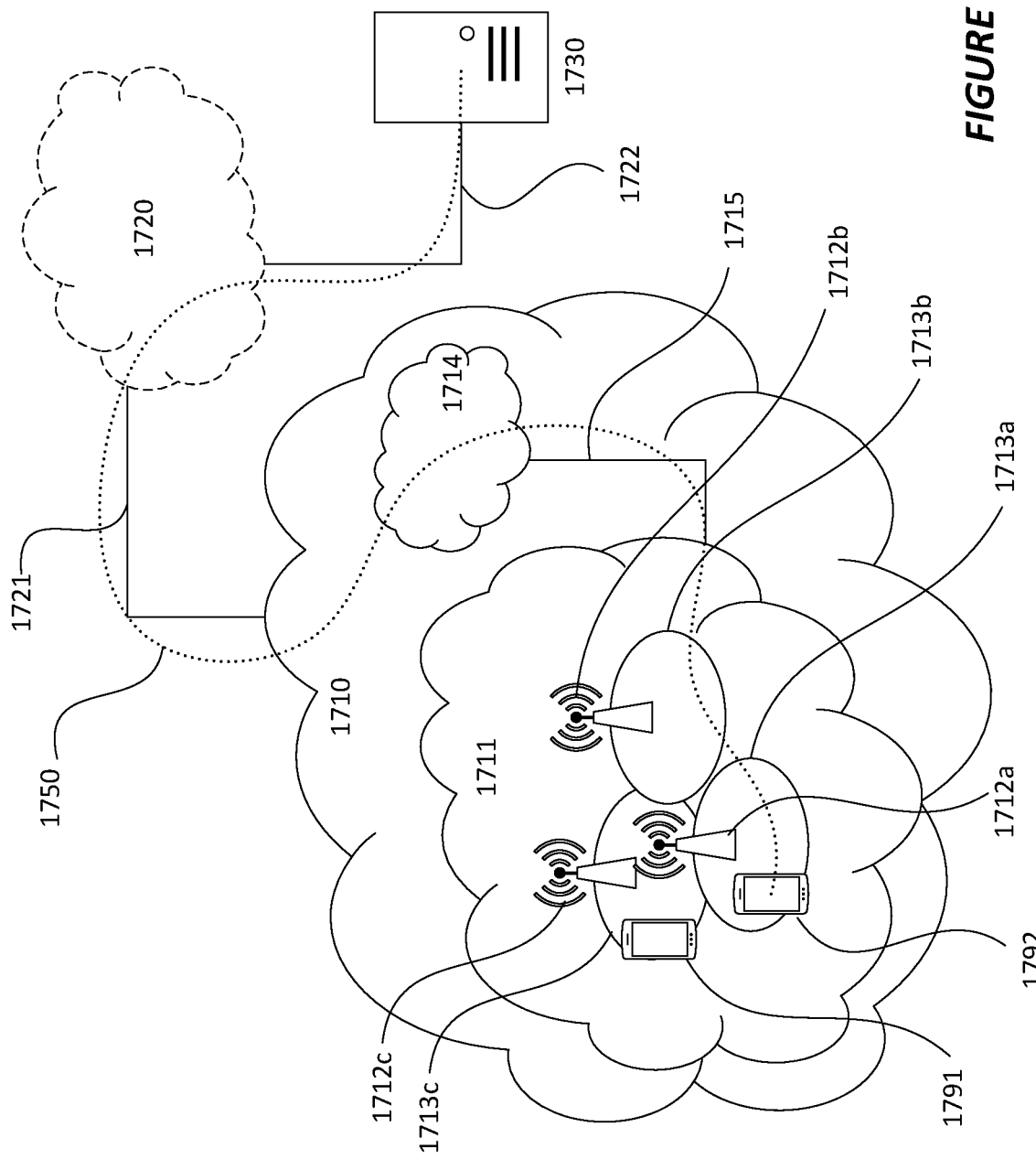
FIG. 17 is a block diagram of a communication network with a host computer according to some embodiments.

FIG. 17 illustrates a telecommunication network connected via an intermediate network to a host computer in accordance with some embodiments. In particular, with reference to FIG. 17, in accordance with an embodiment, a communication system includes telecommunication network 1710, such as a 3GPP-type cellular network, which comprises access network 1711, such as a radio access network, and core network 1714. Access network 1711 comprises a plurality of base stations 1712a, 1712b, 1712c, such as NBs, eNBs, gNBs or other types of wireless access points, each defining a corresponding coverage area 1713a, 1713b, 1713c. Each base station 1712a, 1712b, 1712c is connectable to core network 1714 over a wired or wireless connection 1715. A first UE 1791 located in coverage area 1713c is configured to wirelessly connect to, or be paged by, the corresponding base station 1712c. A second UE 1792 in coverage area 1713a is wirelessly connectable to the corresponding base station 1712a. While a plurality of UEs 1791, 1792 are illustrated in this example, the disclosed embodiments are equally applicable to a situation where a sole UE is in the coverage area or where a sole UE is connecting to the corresponding base station 1712.

Telecommunication network 1710 is itself connected to host computer 1730, which may be embodied in the hardware and/or software of a standalone server, a cloud-implemented server, a distributed server or as processing resources in a server farm. Host computer 1730 may be under the ownership or control of a service provider, or may be operated by the service provider or on behalf of the service provider. Connections 1721 and 1722 between telecommunication network 1710 and host computer 1730 may extend directly from core network 1714 to host computer 1730 or may go via an optional intermediate network 1720. Intermediate network 1720 may be one of, or a combination of more than one of, a public, private or hosted network; intermediate network 1720, if any, may be a backbone network or the Internet; in particular, intermediate network 1720 may comprise two or more sub-networks (not shown).

The communication system of FIG. 17 as a whole enables connectivity between the connected UEs 1791, 1792 and host computer 1730. The connectivity may be described as an over-the-top (OTT) connection 1750. Host computer 1730 and the connected UEs 1791, 1792 are configured to communicate data and/or signaling via OTT connection 1750, using access network 1711, core network 1714, any intermediate network 1720 and possible further infrastructure (not shown) as intermediaries. OTT connection 1750 may be transparent in the sense that the participating communication devices through which OTT connection 1750 passes are unaware of routing of uplink and downlink communications. For example, base station 1712 may not or need not be informed about the past routing of an incoming downlink communication with data originating from host computer 1730 to be forwarded (e.g., handed over) to a connected UE 1791. Similarly, base station 1712 need not be aware of the future routing of an outgoing uplink communication originating from the UE 1791 towards the host computer 1730.

Figure 18:
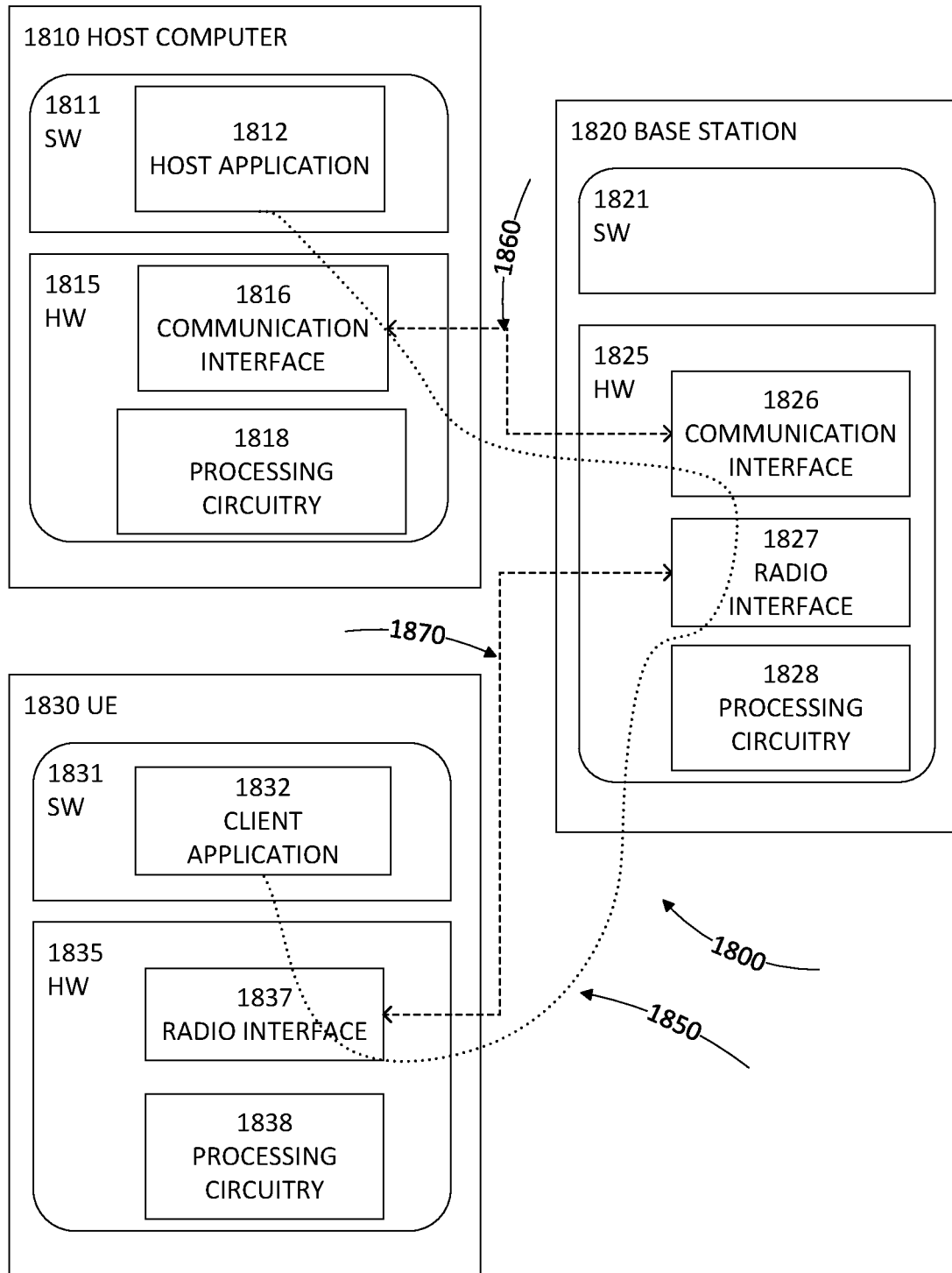
FIG. 18 is a block diagram of a host computer according to some embodiments.

Example implementations, in accordance with an embodiment, of the UE, base station and host computer discussed in the preceding paragraphs will now be described with reference to FIG. 18. FIG. 18 illustrates host computer communicating via a base station with a user equipment over a partially wireless connection in accordance with some embodiments In communication system 1800, host computer 1810 comprises hardware 1815 including communication interface 1816 configured to set up and maintain a wired or wireless connection with an interface of a different communication device of communication system 1800. Host computer 1810 further comprises processing circuitry 1818, which may have storage and/or processing capabilities. In particular, processing circuitry 1818 may comprise one or more programmable processors, application-specific integrated circuits, field programmable gate arrays or combinations of these (not shown) adapted to execute instructions. Host computer 1810 further comprises software 1811, which is stored in or accessible by host computer 1810 and executable by processing circuitry 1818. Software 1811 includes host application 1812. Host application 1812 may be operable to provide a service to a remote user, such as UE 1830 connecting via OTT connection 1850 terminating at UE 1830 and host computer 1810. In providing the service to the remote user, host application 1812 may provide user data which is transmitted using OTT connection 1850.

Communication system 1800 further includes base station 1820 provided in a telecommunication system and comprising hardware 1825 enabling it to communicate with host computer 1810 and with UE 1830. Hardware 1825 may include communication interface 1826 for setting up and maintaining a wired or wireless connection with an interface of a different communication device of communication system 1800, as well as radio interface 1827 for setting up and maintaining at least wireless connection 1870 with UE 1830 located in a coverage area (not shown in FIG. 18) served by base station 1820. Communication interface 1826 may be configured to facilitate connection 1860 to host computer 1810. Connection 1860 may be direct or it may pass through a core network (not shown in FIG. 18) of the telecommunication system and/or through one or more intermediate networks outside the telecommunication system. In the embodiment shown, hardware 1825 of base station 1820 further includes processing circuitry 1828, which may comprise one or more programmable processors, application-specific integrated circuits, field programmable gate arrays or combinations of these (not shown) adapted to execute instructions. Base station 1820 further has software 1821 stored internally or accessible via an external connection.

Communication system 1800 further includes UE 1830 already referred to. Its hardware 1835 may include radio interface 1837 configured to set up and maintain wireless connection 1870 with a base station serving a coverage area in which UE 1830 is currently located. Hardware 1835 of UE 1830 further includes processing circuitry 1838, which may comprise one or more programmable processors, application-specific integrated circuits, field programmable gate arrays or combinations of these (not shown) adapted to execute instructions. UE 1830 further comprises software 1831, which is stored in or accessible by UE 1830 and executable by processing circuitry 1838. Software 1831 includes client application 1832. Client application 1832 may be operable to provide a service to a human or non-human user via UE 1830, with the support of host computer 1810. In host computer 1810, an executing host application 1812 may communicate with the executing client application 1832 via OTT connection 1850 terminating at UE 1830 and host computer 1810. In providing the service to the user, client application 1832 may receive request data from host application 1812 and provide user data in response to the request data. OTT connection 1850 may transfer both the request data and the user data. Client application 1832 may interact with the user to generate the user data that it provides.

It is noted that host computer 1810, base station 1820 and UE 1830 illustrated in FIG. 18 may be similar or identical to host computer 1730, one of base stations 1712a, 1712b, 1712c and one of UEs 1791, 1792 of FIG. 17, respectively. This is to say, the inner workings of these entities may be as shown in FIG. 18 and independently, the surrounding network topology may be that of FIG. 17.

In FIG. 18, OTT connection 1850 has been drawn abstractly to illustrate the communication between host computer 1810 and UE 1830 via base station 1820, without explicit reference to any intermediary devices and the precise routing of messages via these devices. Network infrastructure may determine the routing, which it may be configured to hide from UE 1830 or from the service provider operating host computer 1810, or both. While OTT connection 1850 is active, the network infrastructure may further take decisions by which it dynamically changes the routing (e.g., on the basis of load balancing consideration or reconfiguration of the network).

Wireless connection 1870 between UE 1830 and base station 1820 is in accordance with the teachings of the embodiments described throughout this disclosure. One or more of the various embodiments improve the performance of OTT services provided to UE 1830 using OTT connection 1850, in which wireless connection 1870 forms the last segment.

A measurement procedure may be provided for the purpose of monitoring data rate, latency and other factors on which the one or more embodiments improve. There may further be an optional network functionality for reconfiguring OTT connection 1850 between host computer 1810 and UE 1830, in response to variations in the measurement results. The measurement procedure and/or the network functionality for reconfiguring OTT connection 1850 may be implemented in software 1811 and hardware 1815 of host computer 1810 or in software 1831 and hardware 1835 of UE 1830, or both. In embodiments, sensors (not shown) may be deployed in or in association with communication devices through which OTT connection 1850 passes; the sensors may participate in the measurement procedure by supplying values of the monitored quantities exemplified above, or supplying values of other physical quantities from which software 1811, 1831 may compute or estimate the monitored quantities. The reconfiguring of OTT connection 1850 may include message format, retransmission settings, preferred routing etc.; the reconfiguring need not affect base station 1820, and it may be unknown or imperceptible to base station 1820. Such procedures and functionalities may be known and practiced in the art. In certain embodiments, measurements may involve proprietary UE signaling facilitating host computer 1810's measurements of throughput, propagation times, latency and the like. The measurements may be implemented in that software 1811 and 1831 causes messages to be transmitted, in particular empty or 'dummy' messages, using OTT connection 1850 while it monitors propagation times, errors etc.

Figure 19:
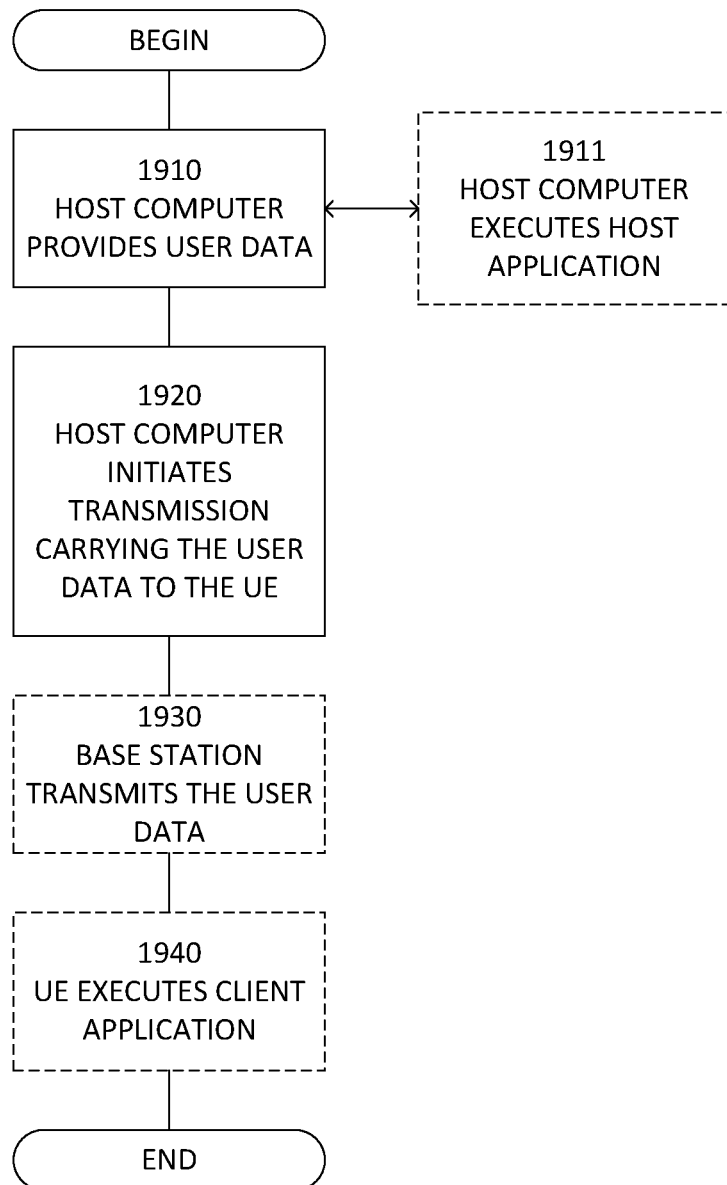
FIG. 19 is a flowchart illustrating a method implemented in a communication system, in accordance with one embodiment.

FIG. 19 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 19 will be included in this section. In step 1910, the host computer provides user data. In substep 1911 (which may be optional) of step 1910, the host computer provides the user data by executing a host application. In step 1920, the host computer initiates a transmission carrying the user data to the UE. In step 1930 (which may be optional), the base station transmits to the UE the user data which was carried in the transmission that the host computer initiated, in accordance with the teachings of the embodiments described throughout this disclosure. In step 1940 (which may also be optional), the UE executes a client application associated with the host application executed by the host computer.

Figure 20:
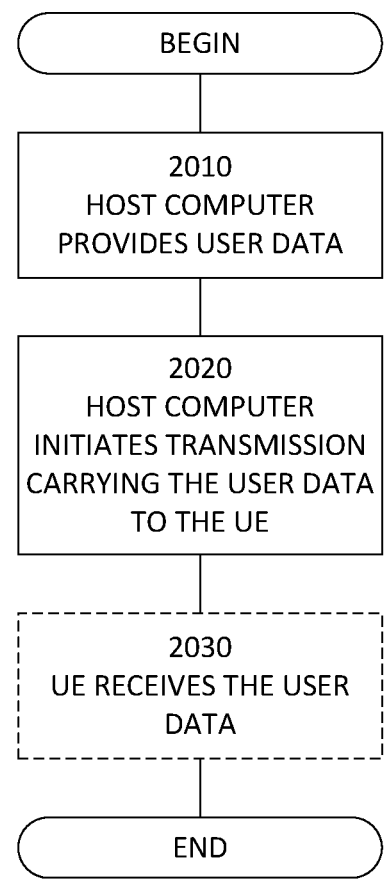
FIG. 20 is a flowchart illustrating a method implemented in a communication system, in accordance with one embodiment.

FIG. 20 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 20 will be included in this section. In step 2010 of the method, the host computer provides user data. In an optional substep (not shown) the host computer provides the user data by executing a host application. In step 2020, the host computer initiates a transmission carrying the user data to the UE. The transmission may pass via the base station, in accordance with the teachings of the embodiments described throughout this disclosure. In step 2030 (which may be optional), the UE receives the user data carried in the transmission.

Figure 21:
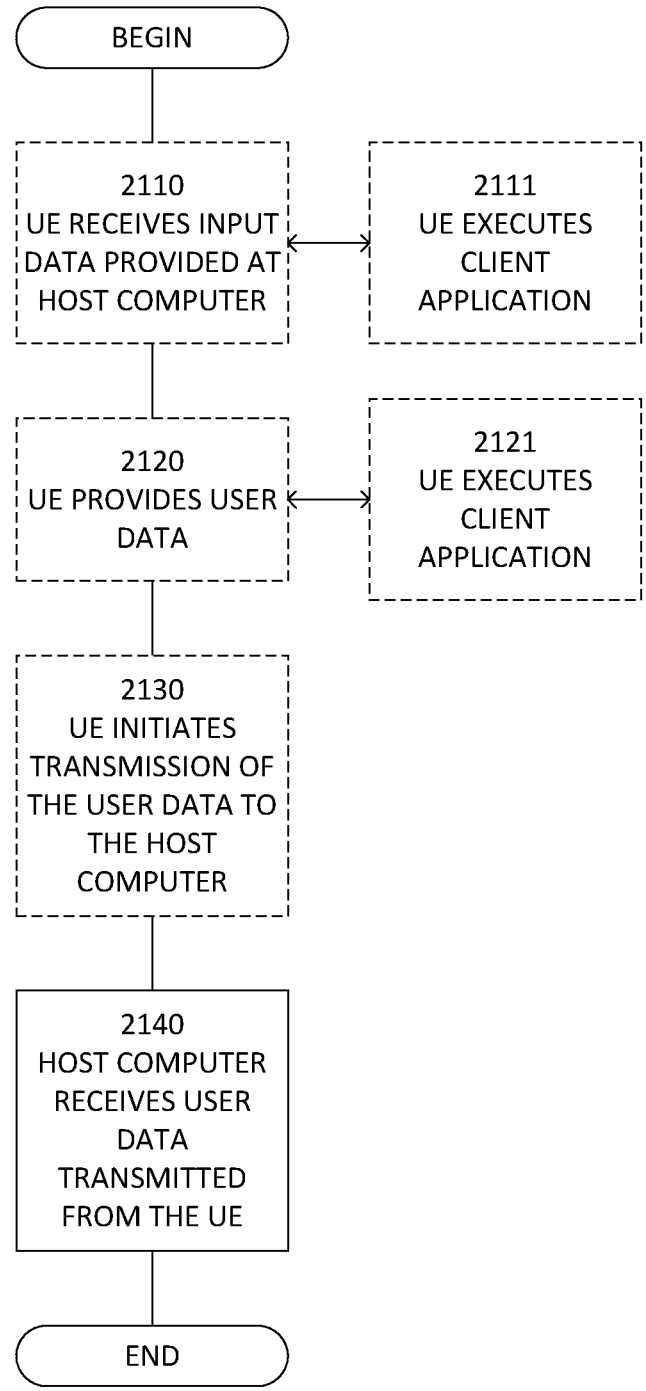
FIG. 21 is a flowchart illustrating a method implemented in a communication system, in accordance with one embodiment.

FIG. 21 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 21 will be included in this section. In step 2110 (which may be optional), the UE receives input data provided by the host computer. Additionally or alternatively, in step 2120, the UE provides user data. In substep 2121 (which may be optional) of step 2120, the UE provides the user data by executing a client application. In substep 2111 (which may be optional) of step 2110, the UE executes a client application which provides the user data in reaction to the received input data provided by the host computer. In providing the user data, the executed client application may further consider user input received from the user. Regardless of the specific manner in which the user data was provided, the UE initiates, in substep 2130 (which may be optional), transmission of the user data to the host computer. In step 2140 of the method, the host computer receives the user data transmitted from the UE, in accordance with the teachings of the embodiments described throughout this disclosure.

Figure 22:
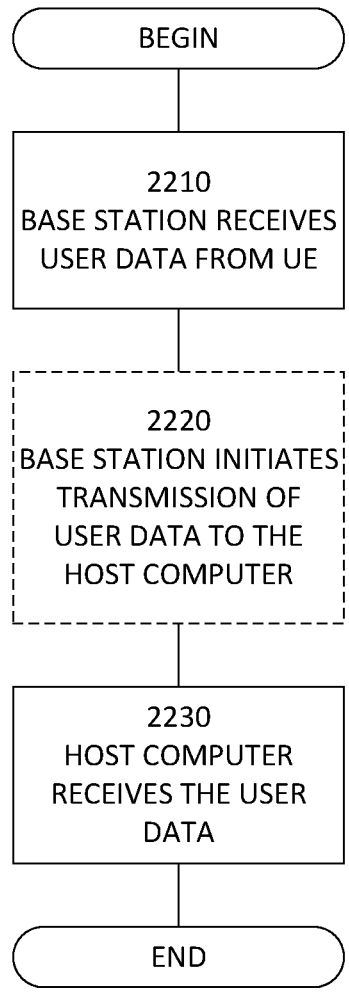
FIG. 22 is a flowchart illustrating a method implemented in a communication system, in accordance with one embodiment.

FIG. 22 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 22 will be included in this section. In step 2210 (which may be optional), in accordance with the teachings of the embodiments described throughout this disclosure, the base station receives user data from the UE. In step 2220 (which may be optional), the base station initiates transmission of the received user data to the host computer. In step 2230 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer.

The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments, the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method performed by a wireless device, the method comprising:
   monitoring for a problem with a certain procedure that would trigger the detection of a radio link failure;
   while monitoring for the problem with the certain procedure, stopping or suspending monitoring for a consistent uplink listen-before-talk (LBT) failure that would also trigger detection of a radio link failure; and
   considering or not considering radio link failure to be detected due to detecting the consistent uplink LBT failure, depending respectively on whether the wireless device is not monitoring or is monitoring for the problem with the certain procedure when consistent uplink LBT failure is detected.

2. The method of claim 1, wherein monitoring for the problem with the certain procedure comprises starting a timer at the beginning of or during the certain procedure and monitoring for expiration of the timer, wherein expiration of the timer indicates the problem with the certain procedure, and wherein said considering or not considering comprises considering or not considering radio link failure to be detected due to detecting consistent uplink LBT failure, depending respectively on whether the timer is not or is running when the consistent uplink LBT failure is detected.

3. The method of claim 1, wherein the considering or not considering comprises, based on the wireless device monitoring for the problem with the certain procedure when consistent uplink LBT failure is detected, not considering radio link failure to be detected due to detecting the consistent uplink LBT failure.

4. The method of claim 3, further comprising:
   based on the monitoring, detecting the problem with the certain procedure; and
   responsive to the detecting the problem with the certain procedure, considering radio link failure to be detected.

5. The method of claim 1, further comprising transmitting a request for connection re-establishment, wherein the request indicates a cause of the request for connection re-establishment as being the consistent uplink LBT failure.

6. The method of claim 1, wherein detecting the consistent uplink LBT failure comprises detecting the consistent uplink LBT failure in an active bandwidth part in a serving cell of the wireless device.

7. The method of claim 1, wherein the certain procedure is a random access procedure, a handover procedure, or a cell change procedure towards a target cell, and wherein detecting the consistent uplink LBT failure comprises detecting consistent uplink LBT failure based on failure to complete an LBT procedure for performing an uplink transmission as part of the certain procedure towards the target cell.

8. The method of claim 1, wherein the problem with the certain procedure is failure of the certain procedure to complete within a certain duration.

9. The method of claim 1, further comprising, upon an occurrence of an uplink LBT failure, incrementing an uplink LBT failure counter and starting or restarting an inter-failure duration timer, wherein the uplink LBT failure counter is to be reset to zero upon expiration of the inter-failure duration timer, and wherein detecting consistent uplink LBT failure comprises detecting that the uplink LBT failure counter reaches or exceeds a threshold.

10. The method of claim 1, wherein the problem with the certain procedure is a problem that would trigger the wireless device to consider radio link failure to be detected.

11. The method of claim 1, wherein the certain procedure is a random access procedure, a handover procedure, or a cell change procedure.

12. The method of claim 1, further comprising receiving, from a network node, signaling indicating whether, or that, the wireless device is to not consider radio link failure to be detected if the wireless device detects the consistent uplink LBT failure while monitoring for a problem with the certain procedure.

13. A wireless device comprising:
   communication circuitry; and
   processing circuitry configured to:
      monitor for a problem with a certain procedure that would trigger the detection of a radio link failure;
      while monitoring for the problem with the certain procedure, stopping or suspending monitoring for a consistent uplink listen-before-talk (LBT) failure that would also trigger detection of a radio link failure; and
      consider or not consider radio link failure to be detected due to detecting the consistent uplink LBT failure, depending respectively on whether the wireless device is not monitoring or is monitoring for the problem with the certain procedure when the consistent uplink LBT failure is detected.

14. The wireless device of claim 13, wherein the processing circuitry is configured to monitor for the problem with the certain procedure by starting a timer at the beginning of or during the certain procedure and monitoring for expiration of the timer, wherein expiration of the timer indicates the problem with the certain procedure, and wherein the processing circuitry is configured to consider or not consider radio link failure to be detected by considering or not considering radio link failure to be detected due to detecting the consistent uplink LBT failure, depending respectively on whether the timer is not or is running when the consistent uplink LBT failure is detected.

* * * * *